United States Patent
Komatsuda et al.

(10) Patent No.: US 10,936,634 B2
(45) Date of Patent: Mar. 2, 2021

(54) SYNONYMOUS COLUMN CANDIDATE SELECTING APPARATUS, SYNONYMOUS COLUMN CANDIDATE SELECTING METHOD, AND SYNONYMOUS COLUMN CANDIDATE SELECTING PROGRAM

(71) Applicant: Hitachi, Ltd., Tokyo (JP)

(72) Inventors: Takuya Komatsuda, Tokyo (JP); Toshihiko Kashiyama, Tokyo (JP); Machiko Asaie, Tokyo (JP)

(73) Assignee: HITACHI, LTD., Tokyo (JP)

( * ) Notice: Subject to any disclaimer, the term of this patent is extended or adjusted under 35 U.S.C. 154(b) by 478 days.

(21) Appl. No.: 15/792,883

(22) Filed: Oct. 25, 2017

(65) Prior Publication Data
US 2018/0181650 A1 Jun. 28, 2018

(30) Foreign Application Priority Data
Dec. 26, 2016 (JP) .............................. JP2016-251592

(51) Int. Cl.
*G06F 16/21* (2019.01)
*G06F 16/33* (2019.01)
*G06F 16/84* (2019.01)
*G06F 16/20* (2019.01)

(52) U.S. Cl.
CPC .......... *G06F 16/3338* (2019.01); *G06F 16/20* (2019.01); *G06F 16/214* (2019.01); *G06F 16/84* (2019.01)

(58) Field of Classification Search
CPC .... G06F 16/20; G06F 16/3338; G06F 16/374; G06F 16/84; G06F 40/18; G06F 40/247
See application file for complete search history.

(56) References Cited

U.S. PATENT DOCUMENTS

2003/0120651 A1* 6/2003 Bernstein ................ G06F 16/86
2007/0185868 A1* 8/2007 Roth ........................ G06F 16/80

FOREIGN PATENT DOCUMENTS

JP 2011-232879 A 11/2011

OTHER PUBLICATIONS

Embley, et al., "Multifaceted Exploitation of Metadata for Attribute Match Discovery in Information Integration", Workshop on information integration on the Web, 2001.

* cited by examiner

*Primary Examiner* — Taelor Kim
(74) *Attorney, Agent, or Firm* — Mattingly & Malur, PC

(57) ABSTRACT

A CPU of a data integration server detects first rare words whose number existing as words relating to configurations of tables of a factory data model is equal to or smaller than a predetermined number, detects second rare words whose number existing as words relating to configurations of tables in a common data model is equal to or smaller than a predetermined number, determines whether or not determination conditions for determining that a second column included in the common data model is a synonymous column candidate of a first column of the factory data model are satisfied, and, in the case where the determination conditions are satisfied, selects the second column as the synonymous column candidate of the first column. The determination conditions include a condition that one of the first rare words around the first column matches one of the second rare words around the second column.

12 Claims, 16 Drawing Sheets

FIG. 9

Column characteristic management information

| Mapping source flag | Column name | Table name | Type of column | Range of data value |
|---|---|---|---|---|
| T | ID | ShiftInfo | Integer | 1-100 |
| T | StartTime | ShiftInfo | Timestamp | 7:00:00-9:00:00 |
| T | EndTime | ShiftInfo | Timestamp | 17:00:00-23:00:00 |
| ⋮ | ⋮ | ⋮ | ⋮ | ⋮ |
| F | ID | Shift | Integer | 1-150 |
| F | StartTime | Shift | Timestamp | 7:00:00-9:00:00 |
| F | Unit | Shift | String | minute, second, hour |
| ⋮ | ⋮ | ⋮ | ⋮ | ⋮ |

401 = Mapping source flag, 402 = Column name, 403 = Table name, 404 = Type of column, 405 = Range of data value, 400

FIG. 10

Column characteristic matching degree management information

| Mapping source column path | Mapping destination column path | Characteristic matching degree |
|---|---|---|
| ShiftInfo.ID | Schedule.ID | 80% |
| ShiftInfo.ID | Shift.ID | 80% |
| ShiftInfo.ID | Calendar.ID | 75% |
| ShiftInfo.ID | ScheduleItem.ID | 75% |
| ⋮ | ⋮ | ⋮ |
| ShiftInfo.ID | Job.Status | 30% |
| ShiftInfo.ID | Job.UpdateTime | 25% |
| ⋮ | ⋮ | ⋮ |

411, 412, 413, 410

FIG. 16
Table matching degree management information
| Mapping source table (601) | Mapping destination table (602) | Column contribution rate within table (603) | Settled column contribution rate (604) | Rare word matching rate (605) | Table matching degree (606) |
|---|---|---|---|---|---|
| ShiftInfo | Shift | 0.67 | 1 | 0.33 | 0.22 |
| ShiftInfo | Calendar | 0 | 0 | 0 | 0 |
| ShiftInfo | Shcedule | 0 | 0 | 0 | 0 |
| ⋮ | ⋮ | ⋮ | ⋮ | ⋮ | ⋮ |
| MSTProd | Layout | 0 | 0 | 0 | 0 |
| MSTProd | Part | 0.5 | 0.5 | 0.33 | 0.083 |
| ⋮ | ⋮ | ⋮ | ⋮ | ⋮ | ⋮ |
FIG. 17
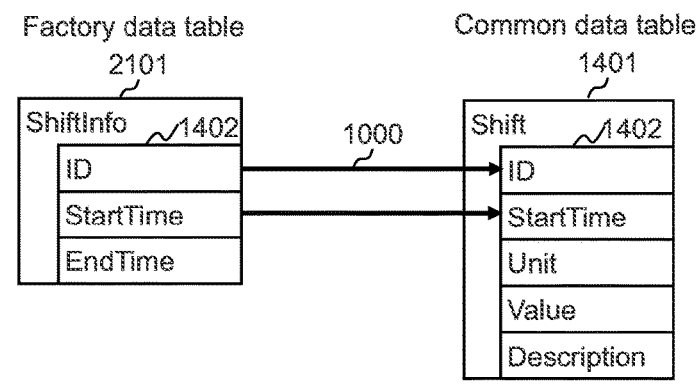
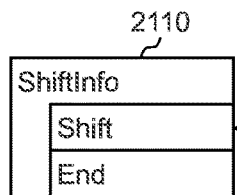

SYNONYMOUS COLUMN CANDIDATE SELECTING APPARATUS, SYNONYMOUS COLUMN CANDIDATE SELECTING METHOD, AND SYNONYMOUS COLUMN CANDIDATE SELECTING PROGRAM

CROSS-REFERENCE TO PRIOR APPLICATION

This application relates to and claims the benefit of priority from Japanese Patent Application No. 2016-251592 filed on Dec. 26, 2016, the entire disclosure of which is incorporated herein by reference.

BACKGROUND

The present invention relates to a synonymous column candidate selecting apparatus, and the like, which selects a synonymous column candidate for a column of a first data model from a second data model.

In recent years, due to long non-operating time of resources (people, facilities) of a factory and facility maintenance cost, reduction of profit has become a problem, and demands for sharing resources among a plurality of factories have been advocated. Therefore, a service which mediates sharing of resources (resource sharing mediation service) has been requested. By sharing resources such as facilities of factories and human resources among factories, some advantages including improvement in a facility operating rate are offered.

For example, in the case where, in a certain factory, there is process of works which is delayed as a result of waiting for completion of processing of a facility whose operating rate is 100%, it is possible to reduce lead time by borrowing resources of another factory. Further, for example, in the case where it is desired to temporarily utilize an expensive manufacturing facility, it is possible to reduce facility purchasing cost by borrowing the facility from another factory.

While it is necessary to collect data (such as CSV, Excel and RDB) of facility information, production schedule, or the like, from factory spots and store the data in a common data model (such as RDB and XML) to be utilized in resource sharing mediation service to realize resource sharing mediation service, because a data model of factory spot data is different from the common data model, it is necessary to convert the factory spot data into common data.

As a technique for supporting data conversion, for example, Japanese Patent Laid-Open No. 2011-232879 discloses a technique of detecting synonymous columns using a search query for a database. Further, Embly, David W., David Jackman, and Li Xu., "Multifaceted Exploitation Metadata for Attribute Match Discovery in Information Integration", Workshop on information integration on the web, 2001, discloses a technique of detecting synonymous columns using a column characteristic amount.

SUMMARY

There is a problem that the technique disclosed in Japanese Patent Laid-Open No. 2011-232879 cannot be utilized in the case where a search query for the database does not exist. For example, in the case where a data model is newly introduced, because a search query has not been issued yet, the technique disclosed in Japanese Patent Laid-Open No. 2011-232879 cannot be used.

In the technique disclosed in Embly, David W., David Jackman, and Li Xu., "Multifaceted Exploitation Metadata for Attribute Match Discovery in Information Integration", Workshop on information integration on the web, 2001, there is a problem that, when columns (such as IDs and start/end time) whose name or types are similar (or the same) frequently appear within the same data model, it is difficult to distinguish among these frequently appearing columns and it requires work to convert data.

The present invention has been made in view of the above-described circumstances, and an object of the present invention is to provide a technique which can easily and appropriately select a synonymous column candidate for a first data model from a second data model.

To achieve the above-described object, a synonymous column candidate selecting apparatus according to one aspect is a synonymous column candidate selecting apparatus which detects from a second data model a synonymous column candidate which is a candidate for a column synonymous with a column of a first data model, and a processor of the synonymous column candidate selecting apparatus executes rare word detection processing of detecting one or more first rare words which are words relating to configurations of each table in the first data model and whose number existing as words relating to configurations of tables other than a belonging table in the first data model is equal to or smaller than a predetermined number and detecting one or more second rare words which are words relating to configurations of each table in the second data model and whose number existing as words relating to configurations of tables other than a belonging table in the second data model is equal to or smaller than a predetermined number, executes determination processing of determining whether or not predetermined determination conditions for determining that a second column of the second data model is a synonymous column candidate of a first column of the first data model are satisfied, and executes selection processing of, in the case where the determination conditions are satisfied, selecting the second column as the synonymous column candidate of the first column, and the determination conditions include a rare word determination condition that one of the first rare words around the first column matches one of the second rare words around the second column.

According to the present invention, it is possible to easily and appropriately select a synonymous column candidate for a column of a first data model from a second data model.

BRIEF DESCRIPTION OF THE DRAWINGS

FIG. 9 is a diagram illustrating an example of column characteristic management information according to Embodiment 1;

FIG. 10 is a diagram illustrating an example of column characteristic matching degree management information according to Embodiment 1;

FIG. 16 is a diagram illustrating an example of table matching degree management information according to Embodiment 1;

FIG. 17 is a diagram explaining a specific example of calculation of a table matching degree according to Embodiment 1;

DETAILED DESCRIPTION OF THE EMBODIMENT

Some embodiments will be described with reference to the drawings. Note that embodiments which will be described below do not limit the invention according to claims, and all of components and their combinations described in the embodiments are not always essential for means for solving the problems of the invention.

Note that only control lines and information lines necessary for description are illustrated in configuration diagrams of the embodiments described below, and not all of the control lines and information lines are always illustrated.

Embodiment 1

Figure 1:
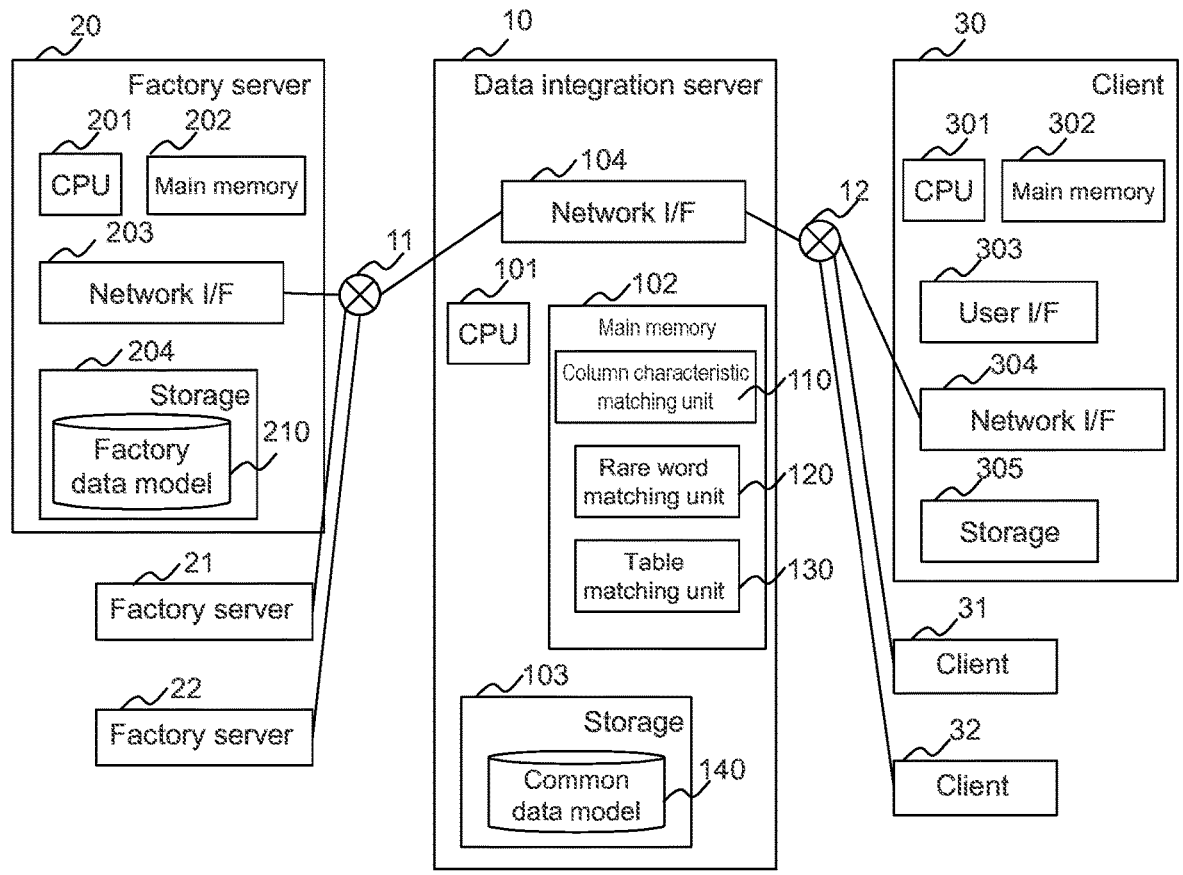
FIG. 1 is a configuration diagram illustrating an example of a computer system according to Embodiment 1.

FIG. 1 is a configuration diagram illustrating an example of a computer system according to Embodiment 1.

The computer system includes a data integration server 10, a plurality of (three in the drawing) factory servers 20, 21, 22, and a plurality of (three in the drawing) clients 30, 31, 32.

The data integration server 10 is connected to the factory servers (20, 21, 22) via a network 11, and the data integration server 10 is connected to the clients (30, 31, 32) via a network 12. Note that the networks 11 and 12 may be, for example, a WAN (Wide Area Network) or may be a LAN (Local Area Network) or any other network.

The data integration server 10, which is an example of a synonymous column candidate selecting apparatus, executes processing for selecting a candidate for a column of a common data model 140 (synonymous column candidate) which is synonymous with a column of a factory data model 210 on the basis of the factory data model 210 (first data model) transmitted from the factory servers (20, 21, 22) and the common data model 140 (second date model). The factory data model 210 is a data model for storing factory data. The factory data includes information regarding workers who work for the factory, manufacturing facilities, and products. The data model includes a plurality of tables. The table includes a plurality of columns. The columns are fields for storing information and, for example, names of workers, date and time of operation of the facilities, parts of products, or the like, are set. The common data model 140 is a data model for communalizing and storing data to be utilized in service using factory data. For example, in the case where factory data is utilized in resource sharing service, the common data includes names of workers who work for the factory, operation time of the facilities, or the like. The synonymous column is a column which belongs to a data model different from a certain column and which stores data synonymous with data stored in the certain column.

The data integration server 10 includes a CPU 101, a main memory 102, a storage 103 and a network I/F (interface) 104. The network I/F 104 is an interface for performing communication with other apparatuses (the factory server 20, the client 30) via the networks 11 and 12. The CPU 101 executes various kinds of processing in accordance with a program stored in the main memory 102.

The storage 103, which is, for example, a hard disk, a flash memory, or the like, stores a program to be executed by the CPU 101 and data to be utilized by the CPU 101. In the present embodiment, the storage 103 stores therein the common data model 140.

The main memory 102, which is, for example, a RAM, stores a program to be executed by the CPU 101 and necessary information. In the present embodiment, the main memory 102 stores a program required for implementing a column characteristic matching unit 110, a rare word matching unit 120 and a table matching unit 130.

The column characteristic matching unit 110 executes processing of selecting mapping candidates through column characteristic matching (mapping candidate selection processing through column characteristic matching). The column characteristics are information characterizing a column, such as a column name and a name of a table to which the column belongs. The column characteristic matching is processing of calculating a degree of similarity of column characteristics (column characteristic matching degree) regarding a pair of columns (column pair) of different data models, or the like. The mapping candidate (synonymous column candidate) refers to a column which becomes a candidate for a synonymous column for a certain column.

The rare word matching unit 120 executes processing of selecting mapping candidates through rare word matching (mapping candidate selection processing through rare word matching). The rare word is a word within a table characterizing a configuration of a table (a word relating to a configuration of a table) and whose number existing in other tables is equal to or smaller than a predetermined number. The predetermined number may be zero, that is, the rare word may be a word which never exists in other tables. What value is set as the predetermined number may be determined in accordance with a target data model, and whether the number of mapping candidates is increased or accuracy of the mapping candidates is increased can be adjusted according to what value is set as the predetermined number. The word within a table characterizing the configuration of the table is, for example, a word included in the name of the table or the name of the column. The rare word matching is processing of determining, for a pair of columns (column pair) of a column in the factory data model 210 and a column in the common data model 140, whether or not rare words around the respective columns match. A range around the column may be within a table to which the column belongs or may be a range including at least one of the table to which the column belongs and an upper or lower table of the table. The range around the column may be determined in accordance with a target data model, and if a narrow range is set as the range around the column, there is tendency that accuracy is increased but the number of mapping candidates is reduced, while, if a wide range is set as the range around the column, there is tendency that accuracy is lowered but the number of mapping candidates increases.

The table matching unit 130 executes processing of selecting mapping candidates through table matching (mapping candidate selection processing through table matching). The table matching is processing of calculating a degree of similarity (table matching degree) between tables of a pair of tables (table pair) of a table in the factory data model 210 and a table in the common data model 140. Note that functions of the column characteristic matching unit 110, the rare word matching unit 120 and the table matching unit 130 may be integrated in one functional unit or may be divided into a plurality of functional units. For example, the column characteristic matching unit 110 may have functions of the rare word matching unit 120 and the table matching unit 130.

The factory server 20 includes a CPU 201, a main memory 202, a network I/F 203 and a storage 204. The configurations of the factory servers 21 and 22 are similar to that of the factory server 20.

The network I/F 203 is an interface for performing communication with other apparatuses (such as the data integration server 10) via the network 11. The CPU 201 executes various kinds of processing in accordance with a program stored in the main storage apparatus 202.

The storage 204, which is, for example, a hard disk, a flash memory, or the like, stores a program to be executed by the CPU 201 and data to be utilized by the CPU 201. In the present embodiment, the storage 204 stores therein the factory data model 210.

The main memory 202, which is, for example, a RAM, stores a program to be executed by the CPU 201 and necessary information.

The client 30 includes a CPU 301, a main memory 302, a user I/F 303, a network I/F 304 and a storage 305. The clients 31 and 32 have similar configurations as that of the client 30.

The network I/F 304 is an interface for performing communication with other apparatuses (such as the data integration server 10) via the network 12. The CPU 301 executes various kinds of processing in accordance with a program stored in the main memory 302. The main memory 302, which is, for example, a RAM, stores a program to be executed by the CPU 301 and necessary information. The storage 305, which is, for example, a hard disk, a flash memory, or the like, stores a program to be executed by the CPU 301 and data to be utilized by the CPU 301. The user interface (user I/F) 303 displays an output result of processing at the data integration server 10 and accepts input from the user.

Outline of mapping candidate selection processing will be described next.

Figure 2:
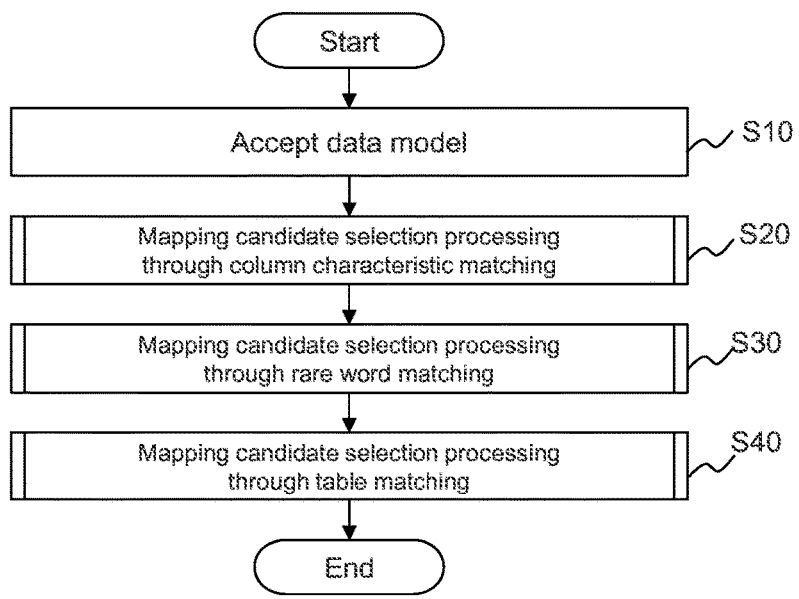
FIG. 2 is a flowchart illustrating outline of mapping candidate selection processing according to Embodiment 1.

FIG. 2 is a flowchart illustrating outline of mapping candidate selection processing according to Embodiment 1.

First, the client 30 instructs the data integration server 10 to acquire the factory data model 210 and the common data model 140, via the network 12. The data integration server 10 which receives the instruction requests the factory server 20 to transmit the factory data model 210 via the network 11. The factory server 20 acquires the factory data model 210 from the storage 204 and transmits the factory data model 210 to the data integration server 10 via the network 11. The data integration server 10 receives the factory data model 210 and holds the factory data model 210 in the main memory 102. Further, the data integration server 10 acquires the common data model 140 from the storage 103 and holds the common data model 140 in the main memory 102 (step S10).

Then, the column characteristic matching unit 110 of the data integration server 10 performs mapping candidate selection processing through column characteristic matching for the factory data model 210 and the common data model 140 acquired in step S10 (step S20). Through the mapping candidate selection processing through column characteristic matching, a column of the common data model 140 which becomes a mapping candidate for a column of the factory data model 210 is selected.

Then, the data integration server 10 executes mapping candidate selection processing through rare word matching for a column for which a number of mapping candidates are selected in step S20 (step S30). Through the mapping candidate selection processing through rare word matching, it is possible to reduce mapping candidates for a column for which a number of mapping candidates are detected in step S20 because column characteristics are similar.

Then, the data integration server 10 executes mapping candidate selection processing through table matching (step 40). Through the mapping candidate selection processing, it is possible to detect mapping candidates from columns which are not detected as the mapping candidates in step S20 because the column characteristics are not similar.

Figures 3, 4:
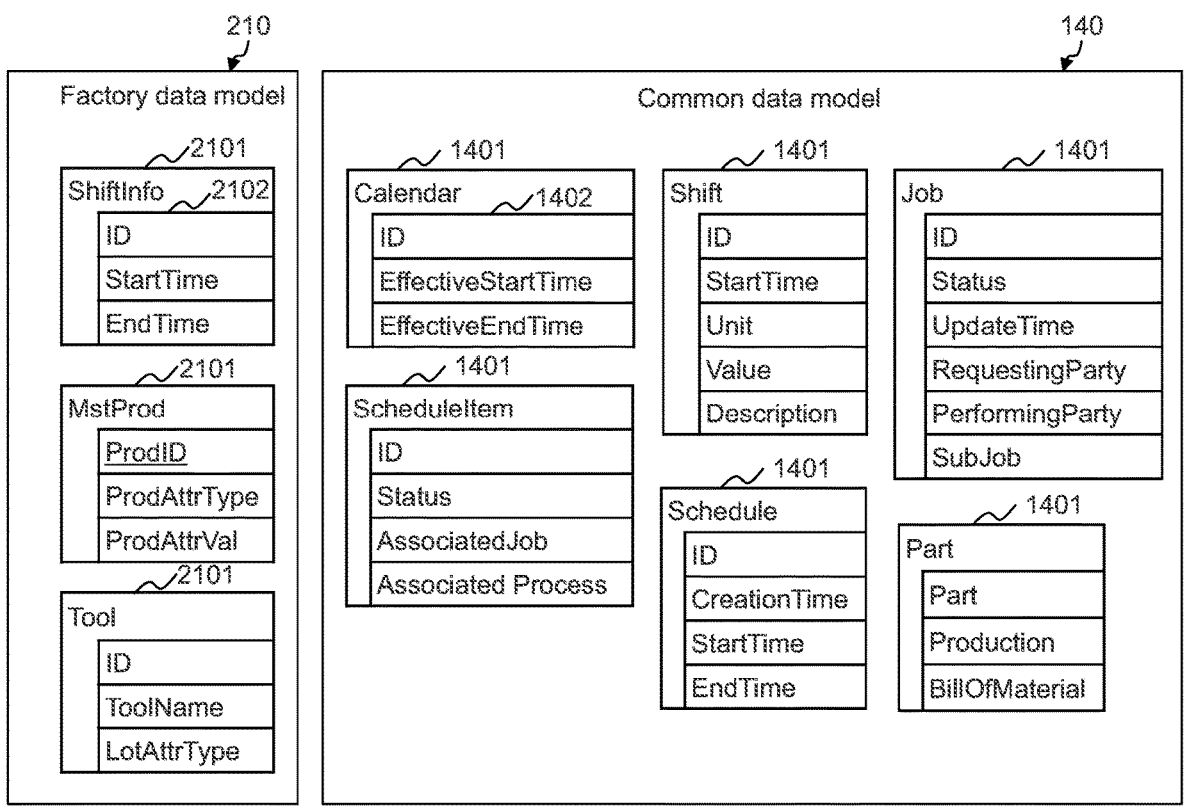
FIG. 3 is a diagram illustrating examples of a factory data model and a common data model according to Embodiment 1.
FIG. 4 is a diagram illustrating an example of a factory data table according to Embodiment 1.

FIG. 3 is a diagram illustrating examples of the factory data model and the common data model according to Embodiment 1.

The factory data model 210 includes a plurality of factory data tables 2101. Each of the factory data tables 2101 includes one or more factory data columns 2102. Each of the factory data columns 2102 is a column which holds information (a specific data value) regarding factory data. Details of the factory data table 2101 will be described using FIG. 4. For example, the factory data model 210 includes tables of "MstProd", "ShiftInfo" and "Tool" as the factory data tables 2101. The "ShiftInfo" table includes "ID", "StartTime" and "EndTime" as the factory data columns 2102.

The common data model 140 includes a plurality of common data tables 1401. Each of the common data tables 1401 includes one or more common data columns 1402. Each of the common data columns 1402 is a column which holds information regarding the common data. Details of the common data table 1401 will be described using FIG. 5. For example, the common data model 140 includes tables of "Calendar", "Shift", "ScheduleItem", "Schedule", "Job" and "Part" as the common data tables 1401. The table of "Calendar" includes "ID", "EffectiveStartTime" and "EffectiveEndTime" as the common data columns 1402.

FIG. 4 is a diagram illustrating an example of the factory data table according to Embodiment 1.

The factory data table 2101 includes a table name 2103, a column name 2102, a type 2104 and data 2105. The table name 2103 is a name of the factory data table 2101. The column name 2102 is name of the column. The type 2104 is a type of data included in the column. The data 2105 is a specific data value regarding the column.

For example, a table whose table name 2103 is "ShiftInfo" includes a column whose column name 2102 is "ID", and the type 2104 of the column whose column name is "ID" is Integer, and the data 2105 of the column whose column name is "ID" is "1", "2", "3", and the like.

Figure 5:
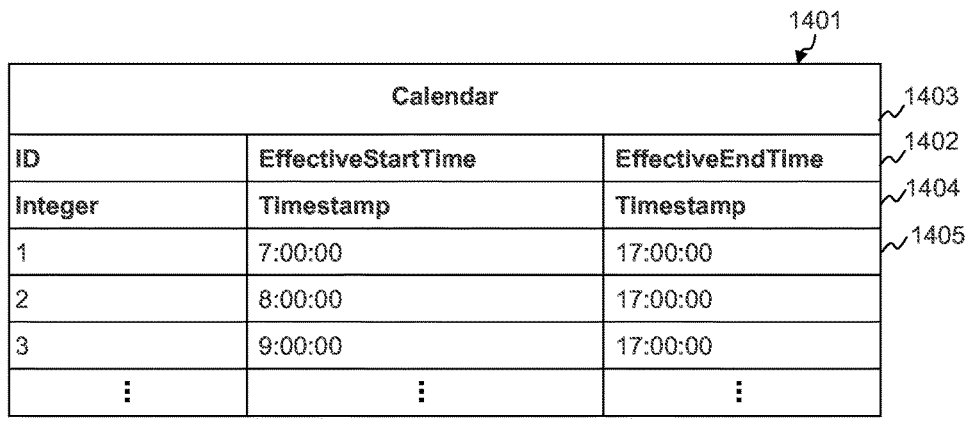
FIG. 5 is a diagram illustrating an example of a common data table according to Embodiment 1.

FIG. 5 is a diagram illustrating an example of the common data table according to Embodiment 1.

The common data table 1401 includes a table name 1403, a column name 1402, a type 1404 and data 1405. The table name 1403 is a name of the common data table 1401. The column name 1402 is a name of the column. The type 1404 is a type of data included in the column. The data 1404 is specific data for the column.

For example, a table whose table name 1403 is "Calendar" includes a column whose column name 1402 is "EffectiveStartTime", the type 1404 of the column whose column name is "EffectiveStartTime" is Timestamp, and the data 1405 of the column whose column name is "EffectiveStartTime" is "7:00:00", or the like.

Figure 6:
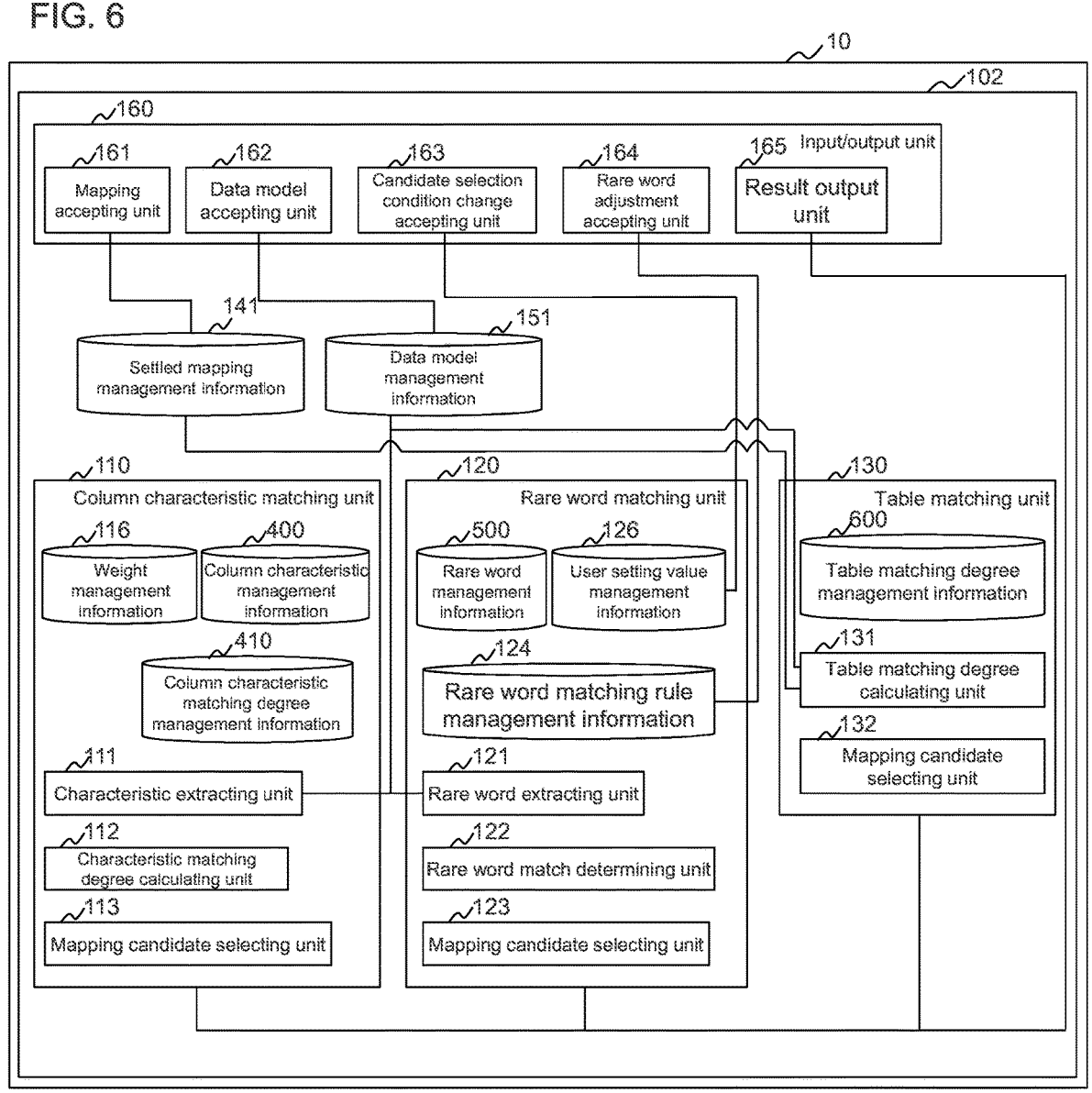
FIG. 6 is a functional configuration diagram of part of a data integration server according to Embodiment 1.

FIG. 6 is a functional configuration diagram of part of the data integration server according to Embodiment 1. FIG. 6 illustrates functional units configured by a program stored in the main memory 102 being executed by the CPU 101 and various kinds of information stored in the main memory 102.

When the program stored in the main memory 102 is executed by the CPU 101, an input/output unit 160, the column characteristic matching unit 110, the rare word matching unit 120 and the table matching unit 130 are configured. Further, the main memory 102 stores settled mapping management information 141 and data model management information 151.

The settled mapping management information 141 is information of a pair of columns settled as synonymous columns (settled column pair). The data model management information 151 is information of the factory data model 210 acquired from the factory server 20 and the common data model 140 acquired from the storage 103.

The input/output unit 160 accepts input upon mapping candidate selection and outputs a result. The input/output unit 160, for example, makes the user I/F 303 of the client 30 display a mapping candidate display screen 800 (see FIG. 18), a rare word adjustment screen 900 (see FIG. 19), or the like, and accepts various kinds of inputs by the user with respect to a screen accepted by the user I/F 303 of the client 30. The input/output unit 160 includes a mapping accepting unit 161, a data model accepting unit 162, a candidate selection condition change accepting unit 163, a rare word adjustment accepting unit 164 and a result output unit 165. The mapping accepting unit 161 accepts designation of the settled column pair from the user, which is received from the client 30 via the network I/F 104 and stores the accepted settled column pair in the settled mapping management information 141. The data model accepting unit 162 accepts designation of a data model from the user, which is received from the client 30 via the network I/F 104, acquires the accepted data model from a storage location of the data model and stores the data model in the data model management information 151.

The candidate selection condition change accepting unit 163 accepts a setting value from the user (user setting value) which is received from the client 30 via the network I/F 104 and stores the user setting value in user setting value management information 126 of the rare word matching unit 120. The user setting value includes ON/OFF of a mapping candidate selection function using rare words, ON/OFF of allowance of partial match upon rare word matching, or the like. The rare word adjustment accepting unit 164 accepts rare word adjustment information complying with designation by the user which is received from the client 30 via the network I/F 104 and stores the rare word adjustment information in rare word matching rule management information 124 of the rare word matching unit 120. The result output unit 165 outputs mapping candidates selected at the column characteristic matching unit 110, the rare word matching unit 120 and the table matching unit 130 to the client 30 via the network I/F 104.

The column characteristic matching unit 110 executes processing of selecting mapping candidates through column characteristic matching (mapping candidate selection processing through column characteristic matching). The column characteristic matching unit 110 includes a characteristic extracting unit 111, a characteristic matching degree calculating unit 112, a mapping candidate selecting unit 113, weight management information 116, column characteristic management information 400 and column characteristic matching degree management information 410.

The weight management information 116 stores therein weight of a column characteristic match calculation formula to be used for column characteristic matching. The column characteristic management information 400 stores therein information regarding column characteristics. Details of the column characteristic management information 400 will be described later. The column characteristic matching degree management information 410 stores therein a column characteristic matching degree. Details of the column characteristic matching degree management information 410 will be described later.

The characteristic extracting unit 111 extracts column characteristics from the data model management information 151 and stores the extracted column characteristics in the column characteristic management information 400. The characteristic matching degree calculating unit 112 calculates a degree of similarity between columns (column characteristic matching degree) on the basis of the column characteristic management information 400 and stores the degree of similarity in the column characteristic matching degree management information 410. The mapping candidate selecting unit 113 selects mapping candidates on the basis of the column characteristic matching degree management information 410. For example, the mapping candidate selecting unit 113 selects a column as a mapping candidate based on a condition, the condition for selecting the column as the mapping candidate is that the column characteristic matching degree is equal to or larger than a threshold.

The rare word matching unit 120 executes processing of selecting mapping candidates through rare word matching (mapping candidate selection processing through rare word matching). The rare word matching unit 120 includes a rare word extracting unit 121, a rare word match determining unit 122, a mapping candidate selecting unit 123, the rare word matching rule management information 124, rare word management information 500 and the user setting value management information 126.

The rare word matching rule management information 124 stores therein a pair of rare words (rare word pair) which are regarded as the same. The rare word management information 500 stores therein the extracted rare words. Details of the rare word management information 500 will be described later. The user setting value management information 126 stores therein a user setting value.

The rare word extracting unit 121 extracts rare words from the data model management information 151 and stores the rare words in the rare word management information 500. The rare word match determining unit 122 determines whether or not the rare word matches for a target column pair using the rare word management information 500. The mapping candidate selecting unit 123 selects a column for which it is determined by the rare word match determining unit 122 that rare word matches as a mapping candidate.

The table matching unit 130 executes processing of selecting mapping candidates through table matching (mapping candidate selection processing through table matching). The table matching unit 130 includes a table matching degree calculating unit 131, a mapping candidate selecting unit 132 and table matching degree management information 600.

The table matching degree management information 600 stores therein a table matching degree. Details of the table matching degree management information 600 will be described later.

The table matching degree calculating unit 131 receives the settled column pair from the settled mapping management information 141, calculates a table matching degree on the basis of the received settled column pair and stores the table matching degree in the table matching degree management information 600. Here, the settled column pair is a column pair which is determined as synonymous columns by the user. The mapping candidate selecting unit 132 acquires the table matching degree from the table matching degree management information 600 and selects mapping candidates on the basis of the acquired table matching degree. For example, the mapping candidate selecting unit 132 selects columns as mapping candidates based on a condition, the condition for selecting the column as the mapping candidate is that the table matching degree is equal to or larger than a threshold.

The column characteristic management information 400 of the column characteristic matching unit 110 will be described in detail next.

FIG. 9 is a diagram illustrating an example of the column characteristic management information according to Embodiment 1.

The column characteristic management information 400, which is information extracted by the characteristic extracting unit 111 of the data integration server 10 from the data model management information 151, includes a plurality of entries having columns of a mapping source flag 401, a column name 402, a table name 403, a type of the column 404 and a range of a data value 405. In the present embodiment, one entry exists for each column of the factory data model and the common data model in the column characteristic management information 400. Note that the configuration of the entry is not limited to this, and other columns such as, for example, an average value of data values and a mode value of data values may be included.

In the mapping source flag 401, a flag indicating whether or not a column corresponding to the entry is a column of a mapping source is stored. In the mapping source flag 401, in the case where the column corresponding to the entry is a column of the mapping source, T is stored, otherwise (in the case where the column is a column of a mapping destination), F is stored. In the present embodiment, the column of the factory data model is a mapping source column, and the column of the common data model is a mapping destination column.

In the column name 402, a name of the column corresponding to the entry is stored. In the table name 403, a name of a table to which the column of the name of the column name 402 belongs is stored. In the type of the column 404, a type of data of the column corresponding to the entry is stored. In the range of the data value 405, a range of a value of data stored in the column is stored.

For example, an entry at the top of the column characteristic management information 400 corresponds to a column "ID" in the table of ShiftInfo of the factory data model 210, "T" is stored in the mapping source flag 401, "ID" is stored in the column name 402, "ShiftInfo" is stored in the table name 403, "Integer" is stored in the type of the column 404, and "1-100" is stored in the range of the data value 405.

The column characteristic matching degree management information 410 of the column characteristic matching unit 110 will be described in detail next.

FIG. 10 is a diagram illustrating an example of the column characteristic matching degree management information according to Embodiment 1.

The column characteristic matching degree management information 410, which is information for managing a column characteristic matching degree (column characteristic similarity degree) calculated by the characteristic matching degree calculating unit 112 of the data integration server 10, includes a plurality of entries having columns of a mapping source column path 411, a mapping destination column path 412 and a column characteristic matching degree 413. In the present embodiment, one entry exists for a pair of the mapping source column and the mapping destination column in the column characteristic matching degree management information 410.

In the mapping source column path 411, an identifier of a column of the mapping source is stored. In the present embodiment, the identifier of the column of the mapping source is expressed by the name of the table to which the mapping source column belongs being connected with the column name of the mapping source column with a dot. In the mapping destination column path 412, an identifier of a column of the mapping destination is stored. In the present embodiment, the identifier of the column of the mapping destination is expressed by the name of the table to which the mapping destination column belongs being connected with the column name of the mapping destination column with a dot. Because the identifier of the column of the mapping source and the identifier of the column of the mapping destination are character strings in which the table name and the column name are connected with dots, even in the case where there exist columns having the same name in the same data model, it is possible to uniquely identify the column.

In the column characteristic matching degree 413, a column characteristic matching degree between a column indicated by the mapping source column path 411 and a column indicated by the mapping destination column path 412 is set in percentage.

For example, an entry on the top of the column characteristic matching degree management information 410 indicates that a column characteristic matching degree between a column of "ShiftInfo.ID" set for the mapping source column path 411, that is, a column of "ID" belonging to the ShiftInfo table of the factory data model 210 and a column of "Schedule.ID" set for the mapping destination column path 412, that is, a column of "ID" belonging to the Schedule table of the common data model 140, is 80%.

The rare word management information 500 of the rare word matching unit 120 will be described in detail next.

Figures 12, 13:
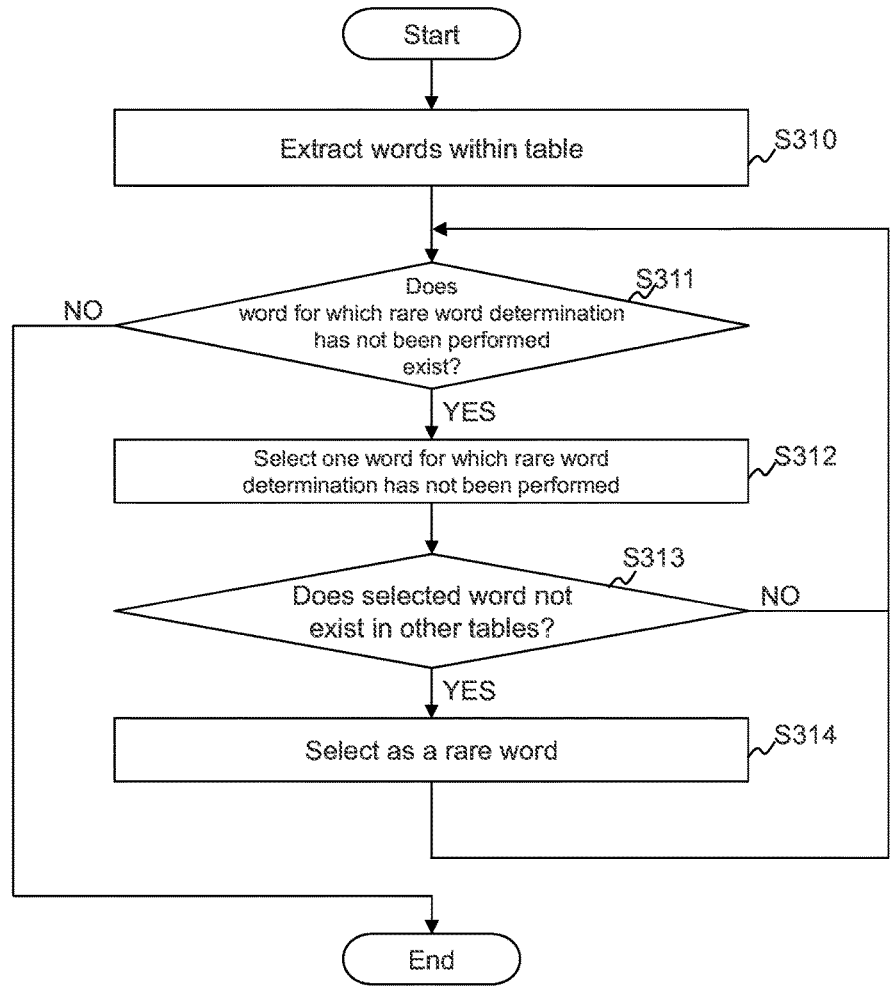
FIG. 12 is a flowchart of rare word extraction processing according to Embodiment 1.
FIG. 13 is a diagram illustrating an example of rare word management information according to Embodiment 1.

FIG. 13 is a diagram illustrating an example of the rare word management information according to Embodiment 1.

The rare word management information 500, which is information extracted by the rare word extracting unit 121 from the data model management information 151, includes a plurality of entries having columns of a mapping source flag 501, a table name 502, a word 503 and a rare word flag 504. In the rare word management information 500, for example, one entry is stored for each word obtained from a table name and a column name of the data model management information 151 (that is, the factory data model, the common data model).

In the mapping source flag 501, a flag indicating whether or not a column corresponding to the entry is a column of a mapping source is stored. In the table name 502, a name of a table in which a word corresponding to the entry is stored is stored. In the word 503, one of the words obtained by the rare word extracting unit 121 applying morphological analysis on the table name and the column name of the data model management information 151 is stored. In the rare word flag 504, a flag indicating whether or not a word stored in the word 503 is a rare word. In the rare word flag 504, in the case where the word stored in the word 503 is a rare word, T is stored, otherwise, F is stored.

The table matching degree management information 600 of the table matching unit 130 will be described in detail next.

FIG. 16 is a diagram illustrating an example of the table matching degree management information according to Embodiment 1.

The table matching degree management information 600, which is information regarding the table matching degree, includes a plurality of entries having columns of a mapping source table 601, a mapping destination table 602, a column contribution rate within a table 603, a settled column contribution rate 604, a rare word matching rate 605 and a table matching degree 606. In the present embodiment, in the table matching degree management information 600, one entry exists for each table pair formed with combination of a table of the factory data model and a table of the common data model.

In the mapping source table 601, a table name of a table which is a mapping source is stored. In the mapping destination table 602, a table name of a table which is a mapping destination is stored. In the column contribution rate within the table 603, a contribution rate of the mapping source table to the mapping destination table is stored. In the settled column contribution rate 604, a contribution rate of the settled mapping column of the mapping source table to the mapping destination table is stored. In the rare word matching rate 605, a ratio of the number of common rare words within the table pair to the total number of rare words within the table pair is stored. In the table matching degree 606, a table matching degree of the table pair is stored. A number between "0" and "1.0" is stored in each of the column contribution rate within the table 603, the settled column contribution rate 604, the rare word matching rate 605 and the table matching degree 606.

A mapping candidate display screen displayed by the input/output unit 160 at the user I/F 303 of the client 30 will be described next.

Figure 18:
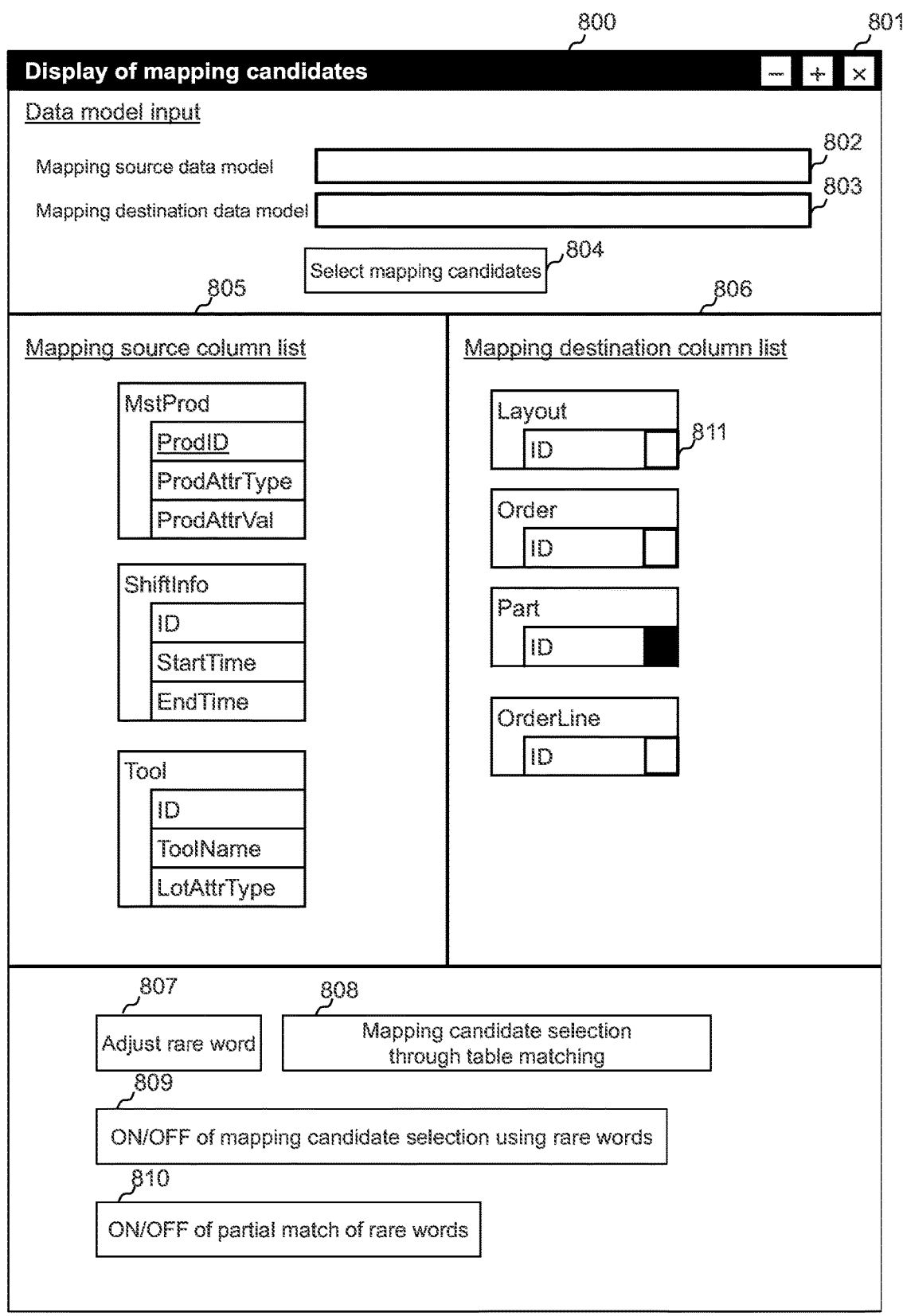
FIG. 18 is a diagram illustrating an example of a mapping candidate display screen according to Embodiment 1.

FIG. 18 is a diagram illustrating an example of the mapping candidate display screen according to Embodiment 1.

The mapping candidate display screen 800 includes a finish button 801, a mapping source data model input form 802, a mapping destination data model input form 803, a mapping candidate selection button 804, a mapping source column list confirmation field 805, a mapping destination column list confirmation field 806, a rare word adjustment button 807, a mapping candidate selection through table matching button 808, a mapping candidate selection using rare words ON/OFF button 809, a rare word partial match ON/OFF button 810 and a mapping settlement check box 811.

The finish button 801 is an operation button for finishing the mapping candidate selection processing (mapping candidate selection program). The mapping source data model input form 802 is an input form for designating a data model which is a mapping source. The mapping destination data model input form 803 is an input form for designating a data model which is a mapping destination. The mapping candidate selection button 804 is a button for starting processing for selecting a synonymous column relating to a column of the mapping source data model from the mapping destination data model.

In the mapping source column list confirmation field 805, a list of columns of the mapping source data model is displayed. In the mapping destination column list confirmation field 806, a list of mapping candidates relating to the mapping source column is displayed. In the mapping destination column list confirmation field 806, when one of the columns displayed in the mapping source column list confirmation field 805 is clicked, a list of mapping candidates for the clicked column is displayed.

The rare word adjustment button 807 is an operation button used by the user to adjust rare words. When the rare word adjustment button 807 is clicked, the rare word adjustment screen 900 (see FIG. 19) is displayed.

The mapping candidate selection through table matching button 808 is a button for executing processing of selecting mapping candidates through table matching. The mapping candidate selection using rare words ON/OFF button 809 is a button for selecting whether or not to execute mapping candidate selection processing (step S30 in FIG. 7) using rare words in the mapping candidate selection processing. Because there is a possibility that there is a column in which rare words do not match in the synonymous columns, by switching OFF the mapping candidate selection using rare words ON/OFF button 809, it is possible to detect a synonymous column in such a case.

Figure 11:
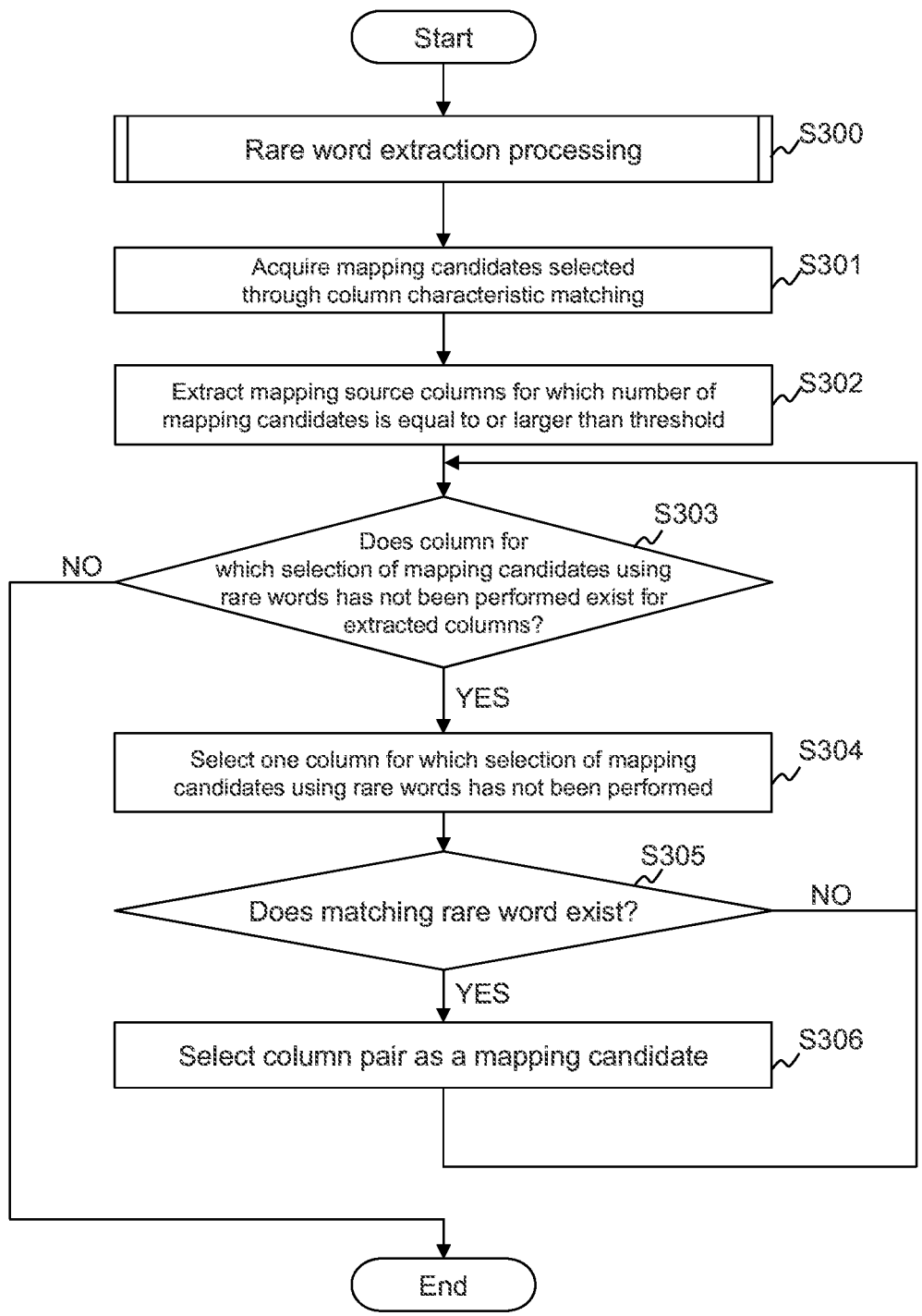
FIG. 11 is a flowchart of mapping candidate selection processing through rare word matching according to Embodiment 1.

The rare word partial match ON/OFF button 810 is a button for selecting whether or not match of rare words includes partial match of rare words upon judgment of match of rare words (step S305 in FIG. 11). Here, partial match is match of part of character strings when two character strings are compared. By switching ON the rare word partial match ON/OFF button 810, judgment of match of rare words can include partial match, so that it is possible to judge rare words which include partially different notation, but have the same meaning as matching rare words. For example, concerning two rare words of "Prod" and "Production", "Prod" is an abbreviation of "Production", and while "Prod" and "Production" have the same meaning, character strings are different. In such a case, by switching ON the rare word partial match ON/OFF button 810, because rare words partially match, it is possible to judge the rare words as matching rare words as a result, so that it is possible to appropriately select column pair having such relationship as a mapping candidate.

The mapping settlement check box 811 is a check box used by the user to give an instruction for settling a column determined as a synonymous column, and if this check box is selected, settled mapping information (synonymous column settlement information) indicating that a column corresponding to the check box is a synonymous column of a predetermined column of the mapping source is transmitted to the data integration server 10. One mapping settlement check box 811 is displayed for each of columns displayed at the mapping destination column list confirmation field 806.

The rare word adjustment screen to be displayed by the input/output unit 160 at the user I/F 303 of the client 30 will be described next.

Figure 19:
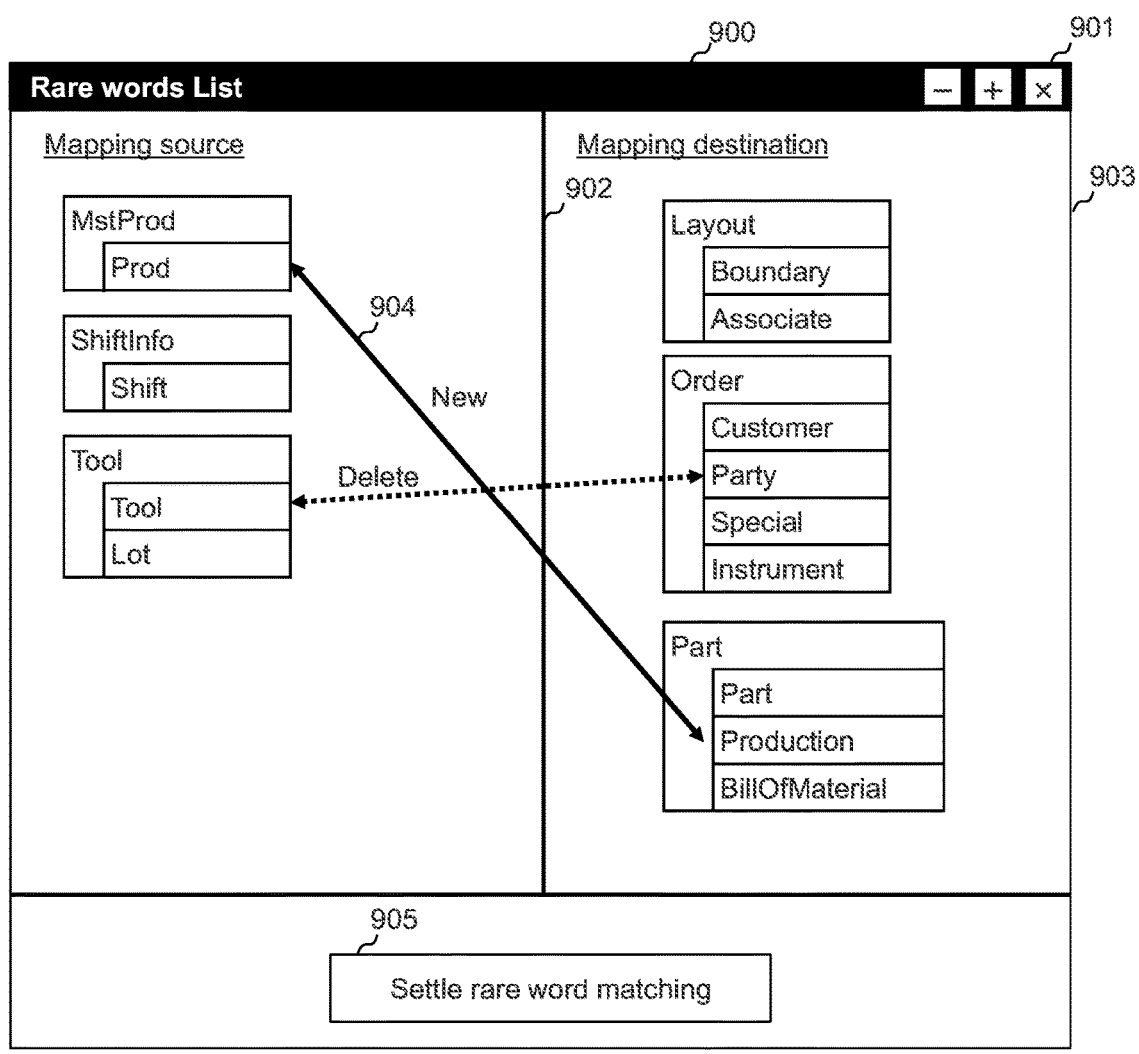
FIG. 19 is a diagram illustrating an example of a rare word adjustment screen according to Embodiment 1.

FIG. 19 is a diagram illustrating an example of the rare word adjustment screen according to Embodiment 1.

The rare word adjustment screen 900, which is a screen to be used by the user of the client 30 to adjust a rare word, includes a finish button 901, a mapping source rare word list display field 902, a mapping destination rare word list display field 903, a rare word matching link 904 and a rare word matching settlement button 905.

The finish button 901 is a button for finishing rare word adjustment processing. In the mapping source rare word list display field 902, a list of rare words of the mapping source data model is displayed. In the mapping destination rare word list display field 903, a list of rare words of the mapping destination data model is displayed. The rare word matching link 904 is a link for connecting matching rare words between the rare words of the mapping source and the rare words of the mapping destination. The rare word matching link 904 can be added or deleted through user operation via the user I/F 303. The rare word matching settlement button 905 is a button for settling a pair of rare words connected by the rare word matching link 904 as matching rare words. When the rare word matching settlement button 905 is depressed, rare word adjustment information including a pair of rare words corresponding to the rare word matching link 904 set at that time is transmitted to the data integration server 10.

Through the rare word adjustment screen 900, even if notation itself of rare words is different, the rare words can be used in processing of selecting mapping candidates through rare word matching assuming that the rare words in a pair of the rare words designated by the user match.

The mapping candidate selection processing will be described in detail next.

Figure 7:
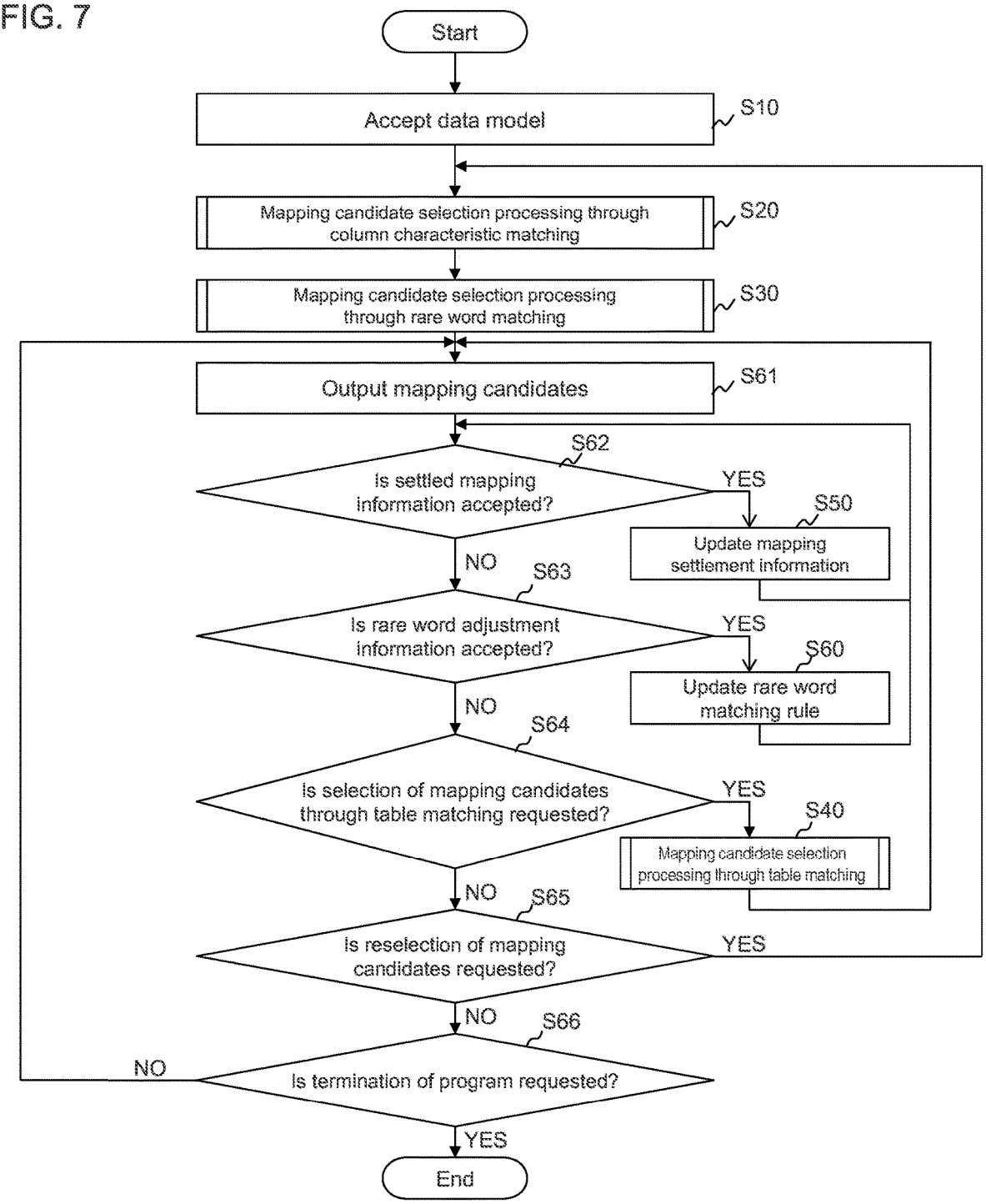
FIG. 7 is a flowchart of the mapping candidate selection processing according to Embodiment 1.

FIG. 7 is a flowchart of mapping candidate selection processing according to Embodiment 1.

The data model accepting unit 162 of the data integration server 10 accepts designation of data models (in the present embodiment, the factory data model 210 and the common data model 140) of a mapping source and a mapping destination which are targets from which synonymous columns are to be selected, from the client 30. When designation of the data models is accepted, the data model accepting unit 162 of the data integration server 10 requests the factory server 20 to transmit the factory data model 210 via the network 11. In response to this, the factory server 20 acquires the factory data model 210 from the storage 204 and transmits the factory data model 210 to the data integration server 10 via the network 11. The data model accepting unit 162 of the data integration server 10 receives the factory data model 210 and stores the factory data model 210 in the main memory 102 as the data model management information 151. Further, the data model accepting unit 162 of the data integration server 10 acquires the common data model 140 from the storage 103 and stores the common data model 140 in the main memory 102 as the data model management information 151 (step S10).

The column characteristic matching unit 110 of the data integration server 10 receives the data model management information 151, performs mapping candidate selection processing (see FIG. 8) through column characteristic matching for selecting mapping candidates through column characteristic matching and transmits the selected mapping candidates to the rare word matching unit 120 (step S20).

The rare word matching unit 120 of the data integration server 10 receives the mapping candidates selected in step S20, performs mapping candidate selection processing (see FIG. 11) through rare word matching for selecting mapping candidates through rare word matching and transmits the selected mapping candidates to the result output unit 165 (step S30).

The result output unit 165 displays a mapping candidate list in the mapping destination column list confirmation field 806 of the mapping candidate display screen 800 on the basis of the mapping candidates received from the rare word matching unit 120 (step S61).

The mapping accepting unit 161 then determines whether or not settled mapping information indicating that synonymous columns are settled is received from the client 30 (step S62), and, in the case where the settled mapping information is accepted (step S62: YES), the mapping accepting unit 161 stores the received settled mapping information in the settled mapping management information 141 (step S50), and shifts the processing to step S62. On the other hand, in the case where the settled mapping information is not accepted (step S62: NO), the mapping accepting unit 161 makes the processing proceed to step S63.

The rare word adjustment accepting unit 164 then determines whether or not the rare word adjustment information is accepted from the client 30 (step S63), and, in the case where the rare word adjustment information is accepted (step S63: YES), the rare word adjustment accepting unit 164 stores the rare word adjustment information in the rare word matching rule management information 124 (step S60), and shifts the processing to step S62. On the other hand, in the case where the rare word adjustment information is not received (step S63: NO), the rare word adjustment accepting unit 164 shifts the processing to step S64.

In step S64, the input/output unit 160 determines whether or not a request for mapping candidate selection through table matching is received from the client 30 (step S64), and, in the case where the request for mapping candidate selection through table matching is accepted (step S64: YES), the table matching unit 130 acquires the settled mapping management information 141, executes mapping candidate selection processing (see FIG. 14) through table matching for selecting mapping candidates through table matching (step S40), and shifts the processing to step S61. On the other hand, in the case where a request for mapping candidate selection through table matching is not accepted (step S64: NO), the table matching unit 130 shifts the processing to step S65.

In step S65, the input/output unit 160 determines whether or not a request for reselection of mapping candidates is accepted from the client 30 (step S65), and, in the case where the request for reselection of mapping candidates is accepted (step S65: YES), the input/output unit 160 shifts the processing to step S20. On the other hand, in the case where a request for reselection of mapping candidates is not accepted (step S65: NO), the input/output unit 160 shifts the processing to step S66.

In step S66, the input/output unit 160 determines whether or not termination of the program is requested from the client 30, and, in the case where termination of the program is requested (step S66: YES), the data integration server 10 terminates the mapping candidate selection processing, while, in the case where termination of the program is not requested (step S66: NO), the processing proceeds to step S61.

The mapping candidate selection processing (step S20 in FIG. 7) through column characteristic matching will be described next.

Figure 8:
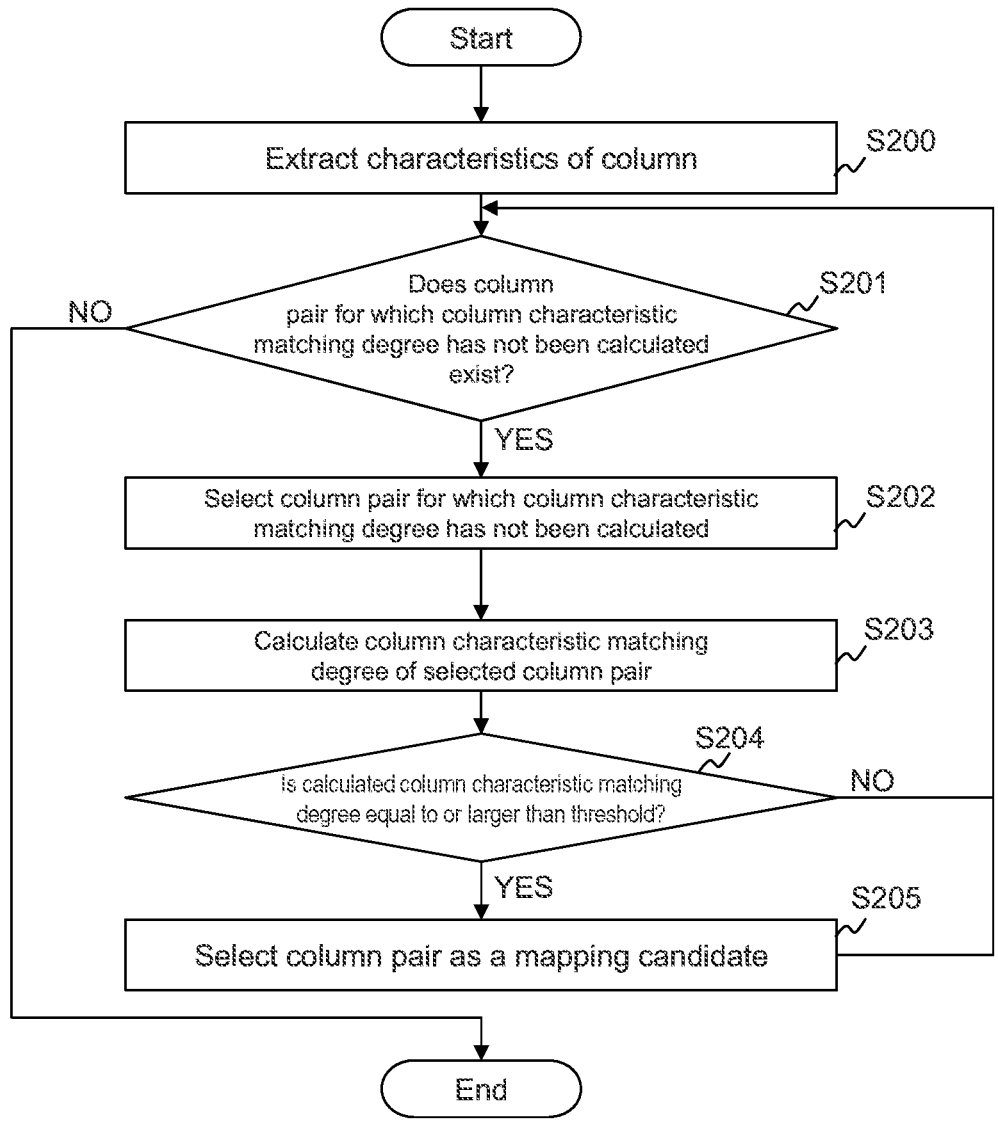
FIG. 8 is a flowchart of the mapping candidate selection processing through column characteristic matching according to Embodiment 1.

FIG. 8 is a flowchart of the mapping candidate selection processing through column characteristic matching according to Embodiment 1.

The characteristic extracting unit 111 of the data integration server 10 receives the data model management information 151 and extracts column characteristics of all the data models of the mapping source and the mapping destination (step S200). The column characteristics include, for example, a column name, a table name, a type of the column, and a range of a data value. The table name is a name of a table to which the column belongs, the range of the data value is a range of a value of data to be stored in the column. Note that the column characteristics are not limited to the column name, the table name, the type of the column and the range of the data value, and, for example, may be configured with the column name and the table name, or other characteristics such as an average value of data and a mode value of data may be added to the column name, the table name, the type of the column and the range of the data value.

The characteristic matching degree calculating unit 112 determines whether or not there exists a column pair for which a column characteristic matching degree has not been calculated among pairs (column pairs) of columns of the mapping source data model (in the present example, the factory data model) and columns of the mapping destination data model (common data model) (step S201).

As a result, in the case where there exists a column pair for which a column characteristic matching degree has not been calculated (step S201: YES), the characteristic matching degree calculating unit 112 selects a column pair for which a column characteristic matching degree has not been calculated (step S202), calculates a column characteristic matching degree of the selected column pair and stores the calculated characteristic matching degree in the column characteristic matching degree management information 410 (step S203).

The characteristic matching degree calculating unit 112, for example, calculates a column characteristic matching degree (MatchFeature(X,Y)) between a column X and a column Y using the following Formula (1).

$$MatchFeature(X, Y) = \qquad (1)$$
$$w_1 * MatchCName(x_1, y_1) + w_2 * MatchTName(x_2, y_2) +$$
$$w_3 * MatchCType(x_3, y_3) + w_4 * MatchDataRange(x_4, y_4)$$

Here, X is column characteristics of the column X and is a set of $x_1$, $x_2$, $x_3$, $x_4$. $x_1$, $x_2$, $x_3$ and $x_4$ are respectively, a column name, a table name, a type of the column and a data value range of the column X. Further, Y is column characteristics of the column Y and is a set of $y_1$, $y_2$, $y_3$, $y_4$. $y_1$ $y_2$, $y_3$ and $y_4$ are respectively a column name, a table name, a type of the column and a data value range of the column Y.

MatchCName($x_1$,$y_1$) is a column name matching degree calculation formula, and, for example, if $x_1$ matches $y_1$, 1 is obtained, otherwise, 0 is obtained.

MatchTName($x_2$,$y_2$) is a table name matching degree calculation formula, and, for example, if $x_2$ matches $y_2$, 1 is obtained, otherwise, 0 is obtained.

MatchCType($x_3$,$y_3$) is a column type matching degree calculation formula, and, for example, if $x_3$ matches $y_3$, 1 is obtained, otherwise, 0 is obtained.

MatchDataRange($x_4$,$y_4$) is a data value range matching degree calculation formula, and, for example, if $x_4$ matches $y_4$, 1 is obtained, otherwise, 0 is obtained.

$w_1$, $w_2$, $w_3$ and $w_4$ are, respectively, pieces of weight in the column name matching degree calculation formula, the table name matching degree calculation formula, the column type matching degree calculation formula and the data value range matching degree calculation formula, and each value falls between 0 and 1. Note that these pieces of weight are stored in the weight management information 116.

Here, as a specific example of calculation of the column characteristic matching degree, a method for calculating a column characteristic matching degree between an ID column of the ShiftInfo table which is the first column in FIG. 4, and an ID column of the Calendar table which is the first column in FIG. 5 will be described. Note that it is assumed that pieces of weight $w_1$, $w_2$, $w_3$ and $w_4$ in Formula (1) are respectively 0.6, 0.2, 0.1 and 0.1.

The column characteristics of the ID column of the ShiftInfo table are such that the column name is "ID", the table name is "ShiftInfo", the type of the column is "Integer", and the range of the data value is "1-100". Meanwhile, the column characteristics of the ID column of the Calendar table are such that the column name is "ID", the table name is "Calendar", the type of the column is "Integer", and the range of the data value is "1-100".

In this case, in Formula (1), because MatchCName("ID", "ID")=1, MatchTName("Shift","Calendar")=0, MatchCType("Integer","Integer")=1, and MatchDataRange("1-100", "1-100")=1, the column characteristic matching degree is 0.6*1+0.2*0+0.1*1+0.1*1=0.8 (80%).

Note that the formula for calculating the column characteristic matching degree is not limited to Formula (1). For example, if $x_2$ partially matches $y_2$, in the table name matching degree calculation, 1 may be obtained, otherwise 0 may be obtained, or it is also possible to use any other calculation method.

The mapping candidate selecting unit 113 then determines whether or not the calculated column characteristic matching degree is equal to or larger than a threshold (step S204), and, if the calculated column characteristic matching degree is equal to or larger than the threshold (step S204: YES), the mapping candidate selecting unit 113 selects a column pair which is made a target for processing as a mapping candidate, passes the selected mapping candidate to the rare word matching unit 120 (step S205) and shifts the processing to step S201. On the other hand, if the calculated column characteristic matching degree is not equal to or larger than the threshold (step S204: NO), the mapping candidate selecting unit 113 shifts the processing to step S201.

Then, in step S201, in the case where a column pair for which a column characteristic matching degree has not been calculated does not exist (step S201: NO), because it means that processing of calculating column characteristic matching degrees for all the column pairs and determining whether or not the column is a mapping candidate has been performed, the mapping candidate selection processing through column characteristic matching is finished.

Through the mapping candidate selection processing through column characteristic matching, it is possible to appropriately select mapping candidates with higher column characteristic matching degrees.

The mapping candidate selection processing (step S30 in FIG. 7) through rare word matching will be described next.

FIG. 11 is a flowchart of the mapping candidate selection processing through rare word matching according to Embodiment 1.

The rare word extracting unit 121 receives the data model management information 151 and executes rare word extraction processing (see FIG. 12) of extracting rare words (step S300).

The rare word match determining unit 122 then receives the mapping candidates selected in the column characteristic matching unit 110 from the mapping candidate selecting unit 113 (step S301), and extracts mapping source columns for which the number of mapping candidates is equal to or larger than a threshold, that is, mapping source columns for which the number of mapping destination columns is equal to or larger than a threshold are selected as candidates on the basis of the received mapping candidates (step S302).

The rare word match determining unit 122 then determines whether or not there exists a column which is not made a target for determination processing of mapping candidate selection using rare words in the extracted mapping source columns (step S303).

As a result, in the case where there exists a column which is not made a target for determination processing of mapping candidate selection using rare words (step S303: YES), the rare word match determining unit 122 selects one of the columns which are not made targets for determination processing of mapping candidate selection using rare words (step S304), compares rare words around respective columns of the selected column and a column of a mapping candidate (mapping destination column) through column characteristic matching for the column, and determines whether or not the rare words around the columns match (step S305). In this determination, matching between rare words around the column and rare words around the column of the mapping candidate (mapping destination column) through column characteristic matching for the column is determination conditions (rare word determination conditions) for determining that the column of the mapping candidate through column characteristic matching is a candidate for a synonymous column of the mapping source column when rare words are taken into account.

In the case where there exists a column pair for which rare words around the columns match (step S305: YES), the mapping candidate selecting unit 123 selects the mapping destination column of the column pair as a mapping candidate using rare words (step S306), and shifts the processing to step S303. On the other hand, in the case where a column pair for which rare words around the columns match does not exist (step S305: NO), the rare word match determining unit 122 shifts the processing to step S303.

Then, in step S303, in the case where a column which is not made a target for determination processing of mapping candidate selection using rare words does not exist (step S303: NO), because it means determination of mapping candidate selection using rare words has been performed for all the mapping source columns extracted in step S302, the mapping candidate selection processing through rare word matching is finished.

Here, for example, mapping candidate selection processing through rare word matching will be described using an example in the case where the mapping candidate selection processing through column characteristic matching is performed for the factory data model 210 and the common data model 140 illustrated in FIG. 3, and an ID column of the Schedule table, an ID column of the Shift table, an ID column of the Calendar table and an ID column of the ScheduleItem table are selected as mapping candidates for ID column of the ShiftInfo table.

In step S304, the rare word match determining unit 122 selects the ID column of the ShiftInfo table, and receives the ID column of the Schedule table, the ID column of the Shift table, the ID column of the Calendar table and the ID column of the ScheduleItem table which are mapping candidates regarding the ID column of the ShiftInfo table.

Then, in step S305, as a result of comparing "Shift" and "End" which are rare words regarding the ID column of the ShiftInfo table with "Schedule" and "Creation" which are rare words regarding the ID column of the Schedule table, "Shift" and "Duration" which are rare words regarding the ID column of the Shift table, "Calendar" and "Effective" which are rare words regarding the ID column of the Calendar table, and "Item", "Association" and "Process" which are rare words regarding the ID column of the ScheduleItem table, because "Shift" which is a rare word regarding the ID column of the ShiftInfo table matches "Shift" which is a rare word regarding the ID column of the Shift table, the rare word match determining unit 122 determines that there exists a matching rare word.

As a result, in step S306, the mapping candidate selecting unit 123 selects an ID column of the Shift table as a synonymous column (mapping candidate) of the ID column of the ShiftInfo table.

As described above, by selecting mapping candidates using rare words, it is possible to select an appropriate mapping candidate among mapping candidates including a frequently appearing column which cannot be identified in the mapping candidate selection processing through column characteristic matching. Here, the frequently appearing column is a column name which frequently appears within the same data model, and, for example, an "ID" column, a "StartTime" column, or the like, in the factory data model 210 and the common data model 140 illustrated in FIG. 3.

The rare word extraction processing (step S300 in FIG. 11) will be described next.

FIG. 12 is a flowchart of the rare word extraction processing according to Embodiment 1.

The rare word extracting unit 121 receives the data model management information 151, applies morphological analysis to names (table name, column name) relating to a table configuration of a data model stored in the received data model management information 151, extracts words (referred to words within a table), and registers the extraction result in the rare word management information 500 (step S310). As an example of the method for extracting words by utilizing morphological analysis, there can be a method in which words are extracted by dividing a name into words with the capital letters as the heads of the words using a capital letter located before a small letter as a delimiter. For example, according to this method, two words of "Shift" and "Info" are extracted from "ShiftInfo".

The rare word extracting unit 121 then determines whether or not there exists a word for which rare word determination has not been performed among the words extracted in step S310 (step S311). As a result, in the case where there exists a word for which rare word determination has not been performed (step S311: YES), the rare word extracting unit 121 selects one of the words for which rare word determination has not been performed (step S312), and determines whether or not the selected word exists in tables (other tables) different from a table to which the selected word belongs in the same data model (step S313).

As a result, in the case where the selected word does not exist in the other tables (step S313: YES), the rare word extracting unit 121 selects the selected word as a rare word, sets "T" indicating that the word is a rare word to the rare word flag 504 in an entry of the corresponding word in the rare word management information 500 (step S314), and shifts the processing to step S311. On the other hand, in the case where the selected word exists in other tables (step S313: NO), because the selected word is not a rare word, the rare word extracting unit 121 shifts the processing to step S311. Note that as a criterion of selection a rare word, while, in the above-described example, a word which does not exist in other tables of the same data model is selected as a rare word, the present invention is not limited to this, and, for example, a word whose number existing in other tables of the same data model is equal to or smaller than a predetermined number which is one or more may be selected as a rare word, that is, a word whose number existing in other tables of the same data model is equal to or smaller than a predetermined number (0 or more) may be selected as a rare word. The predetermined number may be arbitrarily set in accordance with a target data model, or the like.

Then, in step S311, in the case where a word for which rare word determination has not been performed does not exist among the extracted words (step S311: NO), because it means that rare word determination has been performed for all the words extracted in step S310, the rare word extracting unit 121 finishes the rare word extraction processing.

Here, an example in which rare word extraction processing is performed for the factory data model 210 illustrated in FIG. 3 will be described. The factory data model 210 includes a ShiftInfo table, an MstProd table and a Tool table. In step S310, when the rare word extracting unit 121 performs morphological analysis on the factory data model 210, "Shift", "Info", "ID", "Start", "Time" and "End" are extracted as words of the ShiftInfo table, and "Mst", "Prod", "ID", "Attr", "Type" and "Val" are extracted as words of the MstProd table, and "Tool", "ID", "Name", "Lot", "Attr" and "Type" are extracted as words of the Tool table.

In this case, because the word "Shift" of the ShiftInfo table does not exist in the MstProd table and the Tool table which are other tables of the factory data model 210, in step S314, the rare word extracting unit 121 extracts "Shift" as a rare word of the ShiftInfo table. In a similar manner, the rare word extracting unit 121 extracts "Prod" (a rare word of the MstProd table) and "Tool" (a rare word of the Tool table) as rare words.

The mapping candidate selection processing (step S40 in FIG. 7) through table matching will be described next.

Figure 14:
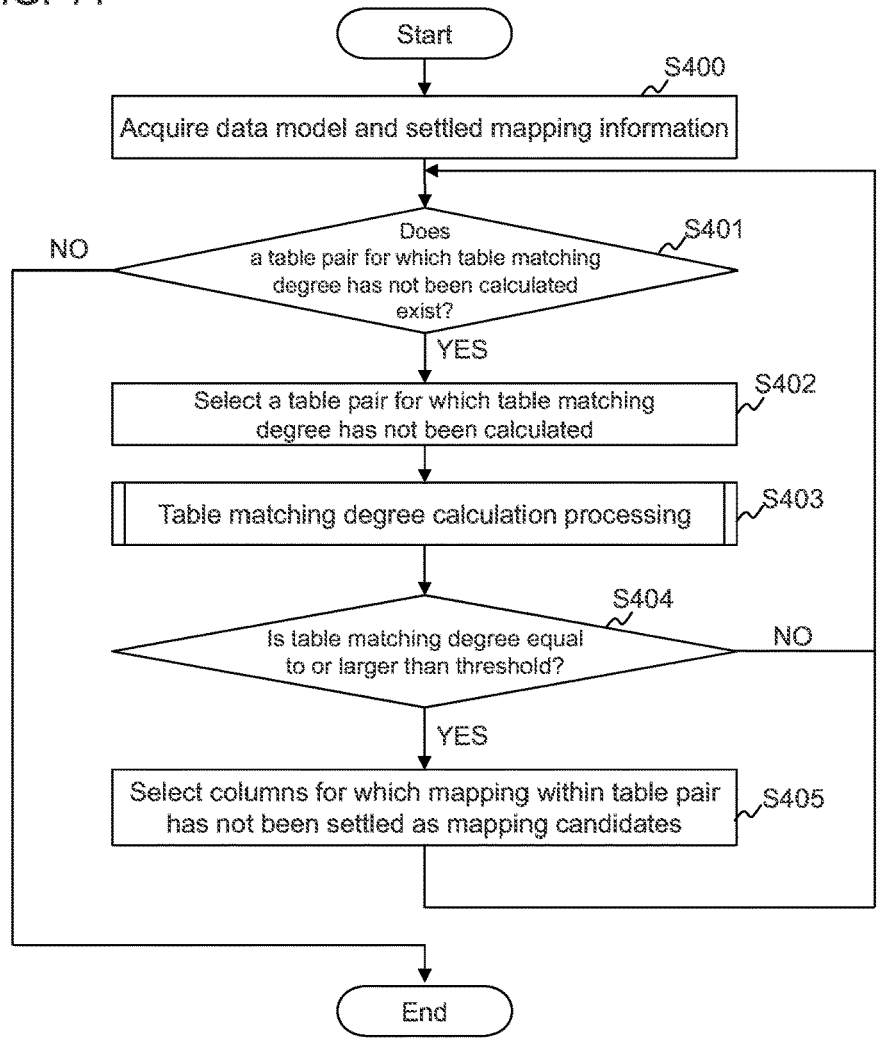
FIG. 14 is a flowchart of mapping candidate selection processing through table matching according to Embodiment 1.

FIG. 14 is a flowchart of mapping candidate selection processing through table matching according to Embodiment 1.

The table matching degree calculating unit 131 of the data integration server 10 receives the settled mapping management information 141 and the data model management information 151 (step S400).

Then, the table matching degree calculating unit 131 determines whether or not there exists a table pair for which a table matching degree has not been calculated for all the table pairs obtained by combining tables of the factory data model 210 and tables of the common data model 140 included in the data model management information 151 one by one (step S401). As a result, in the case where a table pair for which a table matching degree has not been calculated exists (step S401: YES), the table matching degree calculating unit 131 selects a table pair for which a table matching degree has not been calculated (step S402) and executes table matching degree calculation processing (see FIG. 15) of calculating a table matching degree of the selected table pair (step S403).

Then, the mapping candidate selecting unit 132 determines whether or not the calculated table matching degree is equal to or larger than a threshold (step S404), and, in the case where the table matching degree is equal to or larger than the threshold (step S404: YES), the mapping candidate selecting unit 132 selects columns for which mapping has not been settled as mapping candidates for this table pair (step S405), and shifts the processing to step S401. On the other hand, in the case where the table matching degree is not equal to or larger than the threshold, that is, less than the threshold (step S404: NO), the mapping candidate selecting unit 132 shifts the processing to step S401.

Then, in step S401, in the case where a table pair for which a table matching degree has not been calculated does not exist (step S401: NO), because it means that calculation of the table matching degree has been performed for all the table pairs, the table matching degree calculating unit 131 finishes the mapping candidate selection processing through table matching.

Through the mapping candidate selection processing through table matching, it is possible to appropriately select candidates for synonymous columns whose column characteristics are not similar. Specifically, for example, in the case where synonymous columns of the EndTime column of the ShiftInfo table of the factory data model 210 illustrated in FIG. 3 are a Unit column and a Value column of the Shift table of the common data model 140, because column characteristics between the EndTime column and the Unit column or between the EndTime column and the Value column are not similar, the column characteristic matching degree regarding these column pairs is low, so that it is impossible to select the Unit column and the Value column of the Shift table as candidates for synonymous columns of the EndTime column of the ShiftInfot table. However, in the case where a table matching degree between the ShiftInfo table and the Shift table is high, it is possible to select the Unit column and the Value column of the Shift table as candidates for synonymous columns of the EndTime column of the ShiftInfo table.

The table matching degree calculation processing (step S403 in FIG. 14) will be described next.

Figure 15:
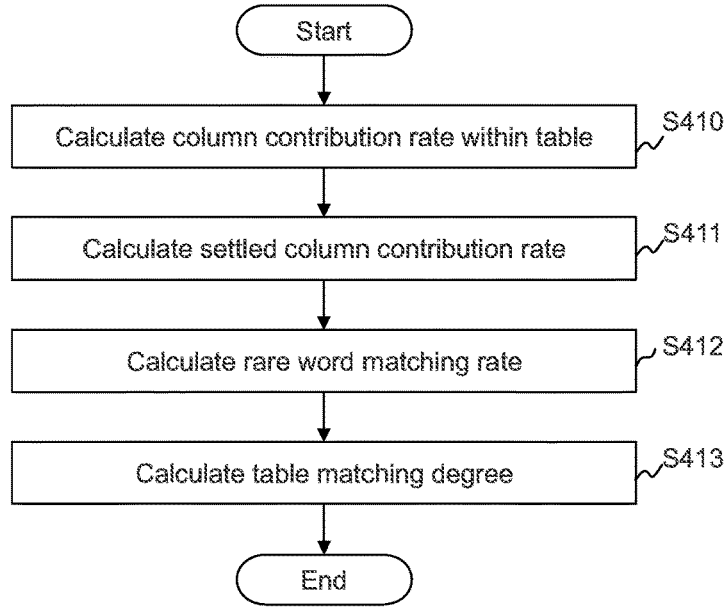
FIG. 15 is a flowchart of table matching degree calculation processing according to Embodiment 1.

FIG. 15 is a flowchart of table matching degree calculation processing according to Embodiment 1.

The table matching degree calculating unit 131 calculates a column contribution rate within a table for the table pair acquired in step S402, creates an entry corresponding to the table pair in the table matching degree management information 600, and stores the calculated column contribution rate within a table in the column contribution rate within a table 603 of the created entry (step S410). Here, the column contribution rate within a table is, for example, a ratio of the number of column pairs for which the acquired synonymous columns within the table pair are settled (settled column pairs number) to the number of columns within the mapping source table. A higher column contribution rate within a table means a higher possibility that the tables of the table pair are similar.

The table matching degree calculating unit 131 then calculates the settled column contribution rate and stores the calculated settled column contribution rate in the settled column contribution rate 604 of the entry corresponding to the table pair of the table matching degree management information 600 (step S411). Here, the settled column contribution rate is a ratio of the settled column pairs number within the acquired table pairs to the number of settled mapping columns within the mapping source table. Further, the number of settled mapping columns is the number of columns for which mapping destinations (synonymous columns to which columns are to be mapped) are settled. A higher settled column contribution rate means a higher possibility that the tables of the table pair are similar.

The table matching degree calculating unit 131 then calculates a rare word matching rate and stores the calculated rare word matching rate in the rare word matching rate 605 of the entry corresponding to the table pair of the table matching degree management information 600 (step S412). Here, the rare word matching rate is a ratio of the number of common rare words within the table pair to the total number of rare words within the table pair. Here, the total number of rare words within the table pair is a sum of rare words except rare words overlapping between the mapping destination table and the mapping source table, and the number of common rare words within the table pair is the number of rare words common between the mapping destination table and the mapping source table. A higher rare word matching rate means a higher possibility that the tables of the table pair are similar.

The table matching degree calculating unit 131 then calculates a table matching degree and stores the calculated table matching degree in the table matching degree 606 of the entry corresponding to the table pair of the table matching degree management information 600 (step S413). Specifically, the table matching degree calculating unit 131 calculates the table matching degree by calculating a product of the column contribution rate within the table calculated in step S410, the settled column contribution rate calculated in step S411 and the rare word matching rate calculated in step S412 (step S413). A higher table matching degree means a higher possibility that the tables of the table pair are similar, that is, means a higher possibility that the columns of the table pair become synonymous columns.

A specific example of calculation of the table matching degree will be described next.

FIG. 17 is a diagram explaining a specific example of calculation of the table matching degree according to Embodiment 1.

For example, the table matching degree calculating unit 131 acquires the ShiftInfo table as the factory data table 2101 and acquires the Shift table as the common data table 1401, and acquires a pair of the ID column of the ShiftInfo table and the ID column of the Shift table, and a pair of the StartTime column of the ShiftInfo table and the ID column of the Shift table as the settled mapping pairs 1000 in step S402. Here, the settled mapping pairs 1000 are pairs of the factory data column 2102 and the common data column 1402 which are judged (settled) as synonymous columns by the user.

The ShiftInfo table is a mapping source table, and includes an ID column, a StartTime column and an EndTime column. Rare words of the ShiftInfo table are Shift and End. The Shift table is a mapping destination table, and includes an ID column, a StartTime column, a Unit column, a Value column and a Description column. Rare words of the Shift table are Shift and Unit.

In step S410, because the number of columns of the ShiftInfo table is three, and the number of settled mapping pairs 1000 between the ShiftInfo table and the Shift table is two, that is, a pair of the ID column of the ShiftInfo table and the ID column of the Shift table and a pair of the StartTime column of the ShiftInfo table and the ID column of the Shift table, the column contribution rate within the table is calculated as $2/3$.

In step S411, because the number of the settled mapping pairs 1000 of the ShiftInfo table is two, and the number of settled column pairs between the ShiftInfo table and the Shift table is two, the settled column contribution rate is calculated as 1.

In step S412, because the total number of rare words within the table pair is three ("Shift", "End" and "Unit"), and the number of common rare words within the table is 1 ("Shift"), the rare word matching rate is calculated as $1/3$.

As a result, in step S413, the table matching rate is calculated as $2/9$ from the calculated column contribution rate within the table, the settled column contribution rate and the rare word matching rate.

As described above, according to the data integration server 10 according to the present embodiment, the column characteristic matching unit 110 selects candidates for synonymous columns on the basis of the column characteristics, the rare word matching unit 120 narrows down the candidates for the synonymous columns through rare word matching for columns including a number of candidates for the synonymous columns among the candidates for the synonymous columns selected at the column characteristic matching unit 110, and the input/output unit 160 transmits the narrowed down candidates for synonymous columns to the client 30, so that the candidates for the synonymous columns are displayed at the client 30. By this means, it is possible to appropriately narrow down a plurality of candidates for synonymous columns selected on the basis of the column characteristics and present the narrowed down candidates for synonymous columns to the user. The user can therefore easily select appropriate synonymous columns from the limited candidates for the synonymous columns.

Further, according to the data integration server 10 according to the present embodiment, the table matching unit 130 calculates a table matching degree for the table pair on the basis of the rare words, selects candidates for the synonymous columns from the columns of the table pair with a higher table matching degree, and makes the client 30 display the candidates for the synonymous columns. By this means, it is possible to appropriately select candidates for synonymous columns whose column characteristics are not similar and present the candidates for the synonymous columns to the user.

Embodiment 2

A computer system according to Embodiment 2 will be described next. Note that a difference from Embodiment 1 will be mainly described for Embodiment 2. The computer system according to Embodiment 2 further includes a function of translating a data model and a function of automatically adjusting weight in the calculation formula of the column characteristic matching degree in the computer system according to Embodiment 1.

Figure 20:
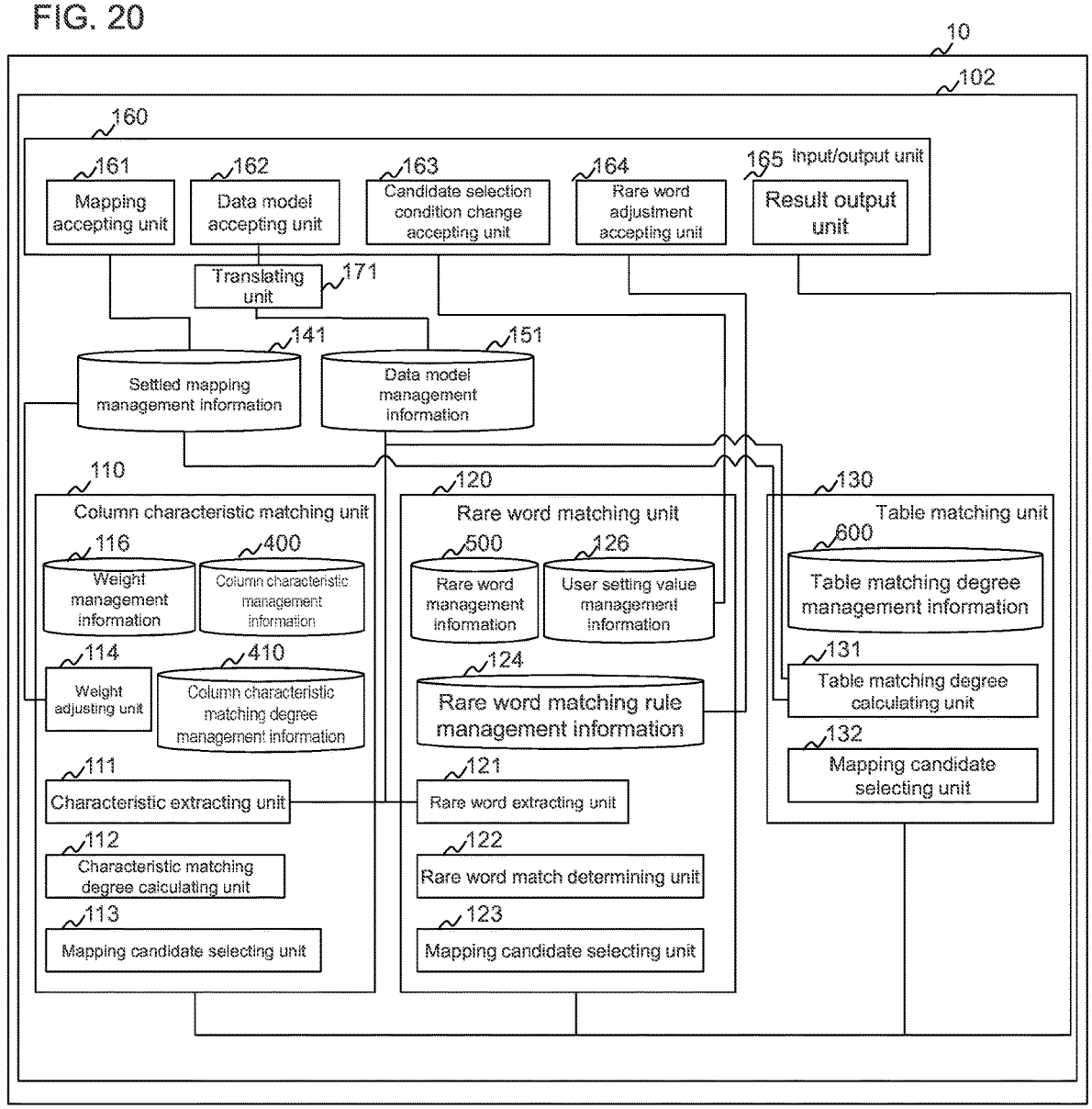
FIG. 20 is a functional configuration diagram of part of a data integration server according to Embodiment 2.

FIG. 20 is a functional configuration diagram of part of a data integration server according to Embodiment 2. FIG. 20 illustrates a functional unit configured by the CPU 101 executing a program stored in the main memory 102 and various kinds of information stored in the main memory 102.

Note that, in FIG. 20, the same reference symbols are assigned to parts similar to functional components according to Embodiment 1 illustrated in FIG. 6.

When the program stored in the main memory 102 is executed by the CPU 101, a weight adjusting unit 114 and a translating unit 171 are configured in addition to the components similar to those in Embodiment 1.

The weight adjusting unit 114 receives the settled mapping management information 141 and executes processing of automatically adjusting weight of the column characteristic matching degree calculation formula indicated in Formula (1).

The translating unit 171 receives the factory data model 210 and the common data model 140 from the data model accepting unit 162, and, in the case where a language used within the factory data model 210 is different from a language used in the common data model 140, the translating unit 171 translates the language used in the factory data model 210 or the language used in the common data model 140 so that the language used in the factory data model 210 and the language used in the common data model 140 become the same. For example, in the case where the factory data model 210 is described in Japanese, and the common data model 140 is described in English, the translating unit 171 translates Japanese in the factory data model 210 into English. By this means, words which indicate the same meaning, but described in different languages, for example, a word such as "Seihin (actually written in Japanese)" and "Product", can be represented with the same notation, so that it is possible to prevent mismatch in column characteristic matching or mismatch in rare word matching, caused by a difference in notation due to only a difference in language.

Mapping candidate selection processing according to Embodiment 2 will be described in detail next.

Figure 21:
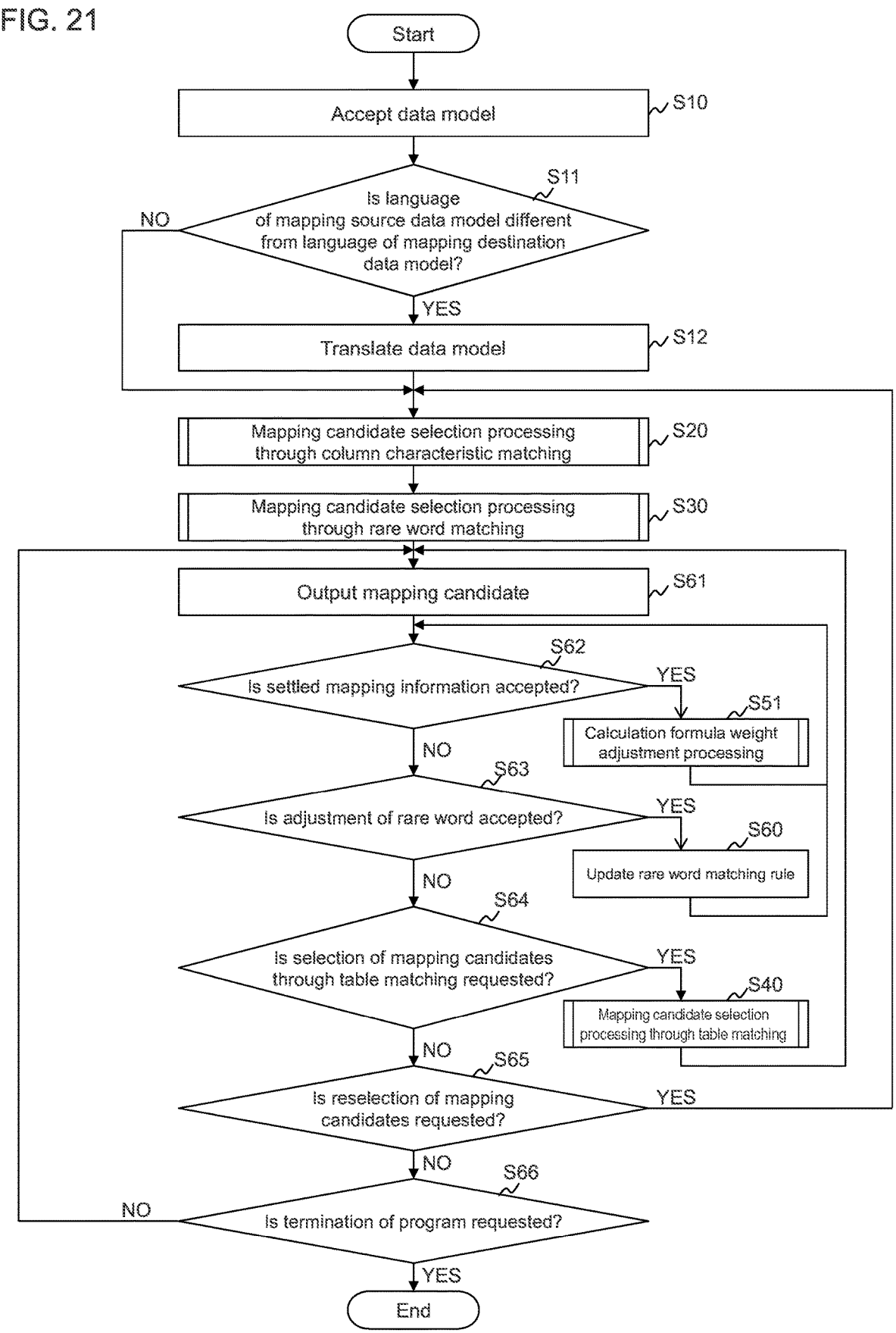
FIG. 21 is a flowchart of mapping candidate selection processing according to Embodiment 2.

FIG. 21 is a flowchart of the mapping candidate selection processing according to Embodiment 2. Note that the same reference symbols will be assigned to steps which are similar to those in the mapping candidate selection processing according to Embodiment 1 illustrated in FIG. 7, and overlapping description will be omitted.

The mapping candidate selection processing according to Embodiment 2 further includes processing of translating a data model (step S11 and step S12) and processing of adjusting weight of the calculation formula S51 in the mapping candidate selection processing according to Embodiment 1.

In step S11, the translating unit 171 of the data integration server 10 determines whether or not the language used within the mapping source data model is different from the language used within the mapping destination data model (step S11), and, in the case where these languages are different (step S11: YES), the translating unit 171 translates the language used within the mapping source data model or the language used within the mapping destination data model and stores the translated data model in the main memory 102 as the data model management information 151. Note that, in the following processing steps, processing is performed using the translated data model.

In step S62, in the case where the settled mapping information is accepted (step S62: YES), the received settled mapping information is stored in the settled mapping management information 141, and the weight adjusting unit 134 executes calculation formula weight adjustment processing (see FIG. 22) of automatically adjusting weight of the column characteristic matching degree calculation formula illustrated in Formula (1) (step S51).

The calculation formula weight adjustment processing (step S51 in FIG. 21) will be described next.

Figure 22:
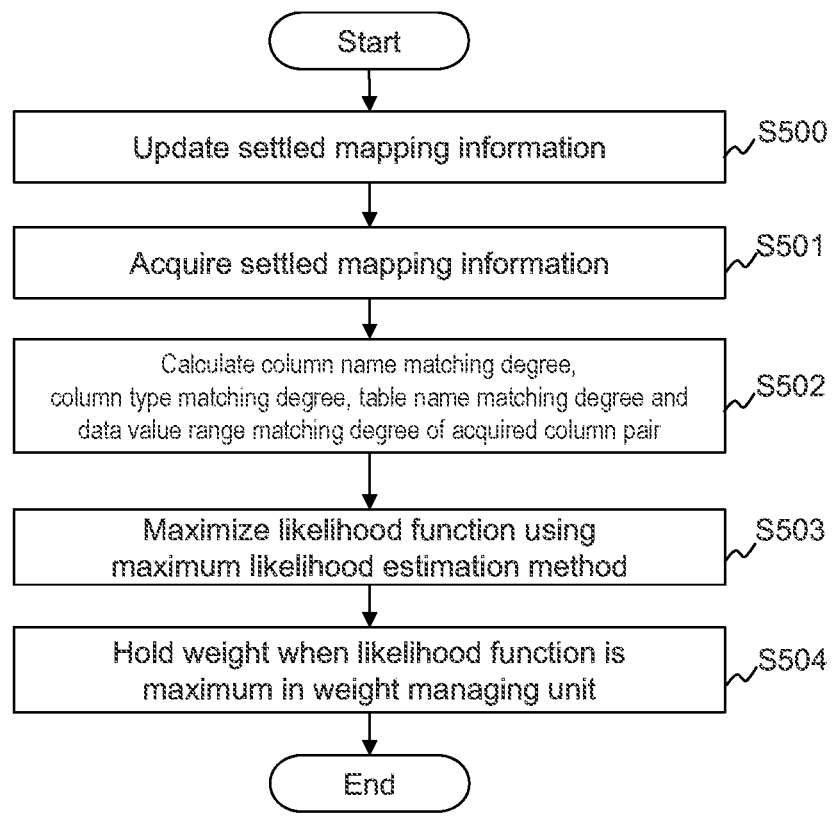
FIG. 22 is a flowchart of calculation formula weight adjustment processing according to Embodiment 2.

FIG. 22 is a flowchart of the calculation formula weight adjustment processing according to Embodiment 2.

The mapping accepting unit 161 of the data integration server 10 stores the accepted settled mapping information in the settled mapping management information 141 (step S500), and transmits the settled mapping management information 141 to the weight adjusting unit 114 (step S501).

The weight adjusting unit 114 calculates a column name matching degree, a column type matching degree, a table name matching degree and a data value range matching degree for a column pair included in the received settled mapping management information 141 (step S502). Here, the column name matching degree, the column type matching degree, the table name matching degree and the data value range matching degree are values calculated by the column name matching degree calculation formula, the column type matching degree calculation formula, the table name matching degree calculation formula and the data value range matching degree calculation formula in Formula (1).

The weight adjusting unit 114 then assigns the column name matching degree, the column type matching degree, the table name matching degree and the data value range matching degree calculated in step S502 in a likelihood function and maximizes the likelihood function through a maximum likelihood estimation method (step S503). The weight adjusting unit 114 then stores weight when the likelihood function is the maximum in the weight management information 116 (step S504).

The likelihood function to be used can be expressed as, for example, the following Formula (2) and Formula (3).

$$L(W|X,Y) = \Pi_{i-1}^{N}(f(W|X_i,Y_i)) \quad (2)$$

$$f(W|X_i, Y_i) = \quad (3)$$
$$w_1 * MatchCName(x_{i1}, y_{i1}) + w_2 * MatchTName(x_{i1}, x_{i2}) +$$
$$w_3 MatchCType(x_{i3}, y_{i3}) + w_4 * MatchDataRange(x_{i4}, y_{i4})$$

Here, $L(W|X,Y)$ is a likelihood function, and $f(W|X_i,Y_i)$ is a column characteristic matching degree of the i-th column pair included in the settled mapping management information 141. N is the number of column pairs included in the settled mapping management information 141. X is column characteristics of the mapping source, and is a set of $X_1, X_2, \ldots, X_N$. $X_i$ is column characteristics relating to the i-th column and is a set of $x_{i1}, x_{i2}, x_{i3}, x_{i4}$. $x_{i1}, x_{i2}, x_{i3}$ and $x_{i4}$ are respectively, a column name, a table name, a type of the column and a data value range. Y is column characteristics of the mapping destination and is a set of $Y_1, Y_2, \ldots, Y_N$. Yi is column characteristics of the i-th column and is a set of $y_{i1}, y_{i2}, y_{i3}$ and $y_{i4}$. $y_{i1}, y_{i2}, y_{i3}$ and $y_{i4}$ are respectively a column name, a table name, a type of the column and a data value range.

MatchCName($x_{i1},y_{i1}$) is a column name matching degree calculation formula, and, for example, if $x_{i1}$ matches $y_{i1}$, 1 is obtained, otherwise 0 is obtained.

MatchTName($x_{i2},y_{i2}$) is a table name matching degree calculation formula, and, for example, if $x_{i2}$ matches $y_{i2}$, 1 is obtained, otherwise 0 is obtained.

MatchCType($x_{i3},y_{i3}$) is a column type matching degree calculation formula, and, for example, if $x_{i3}$ matches $y_{i3}$, 1 is obtained, otherwise 0 is obtained.

MatchDataRange($x_{i4}$,$y_{i4}$) is a data value range matching degree calculation formula, and, for example, if $x_{i4}$ matches $y_{i4}$, 1 is obtained, otherwise 0 is obtained.

W is weight, and is a set of $w_1$, $w_2$, $w_3$ and $w_4$. $w_1$, $w_2$, $w_3$ and $w_4$ are respectively pieces of weight for the column name matching degree calculation formula, the table name matching degree calculation formula, the column type matching degree calculation formula and the data value range matching degree calculation formula, and a range of each value falls between 0 and 1. Note that a sum of the pieces of weight $w_1$, $w_2$, $w_3$ and $w_4$ is 1.

Further, the maximum likelihood estimation method is a method for determining weight, and, for example, grid search can be used. The grid search is a method in which a value of weight is input to the likelihood function at regular intervals, and a value of weight when an output value of the likelihood function becomes the maximum is determined. The weight adjusting unit 114 sets the value of weight when the output value of the likelihood function becomes the maximum as weight for the column characteristic matching formula.

For example, in the case where the column matching formula is $f(X,Y)=w_1*\text{MatchCName}(x_1,y_1)+w_2*\text{MatchTName}(x_2,y_2)$, two types of a column pair A and a column pair B are stored in the settled mapping management information 141, values of MatchCName($x_1$,$y_1$), and MatchTName($x_2$,$y_2$) of the column pair A stored in the settled mapping management information 141 are respectively 0.1 and 0.8, and values of MatchCName($x_1$,$y_1$) and MatchTName($x_2$,$y_2$) of the column pair B are respectively 0.6 and 0.2, the likelihood function is $L(W|X,Y)=(w_1*0.1+w_2*0.8)*(w_1*0.6+w_2*0.2)$. Further, in the case where weight is determined through grid search using the likelihood function, values are input to $w_1$ and $w_2$ of the likelihood functions at intervals of 0.1, and a value ($w_1$,$w_2$)=(0.3, 0.7) when the output value of the likelihood function becomes the maximum is detected. This value becomes weight of the column characteristics matching formula.

As described above, because, in the data integration server 10 according to Embodiment 2, the weight adjusting unit 114 adjusts weight of the column characteristic matching degree calculation formula on the basis of the settled mapping information based on an instruction from the user, it is possible to improve calculation accuracy of the column characteristic matching degree thereafter, so that it is possible to select an appropriate candidate for the synonymous column and provide the candidate to the user.

Embodiment 3

A computer system according to Embodiment 3 will be described next. Note that a difference from Embodiment 1 will be mainly described for Embodiment 3. The computer system according to Embodiment 3 further includes a function of determining match of rare words by utilizing a pair of rare words determined as matching rare words in the past by the user in the computer system according to Embodiment 1.

Mapping candidate selection processing through rare word matching according to Embodiment 3 (step S30 in FIG. 7) will be described in detail next.

Figure 23:
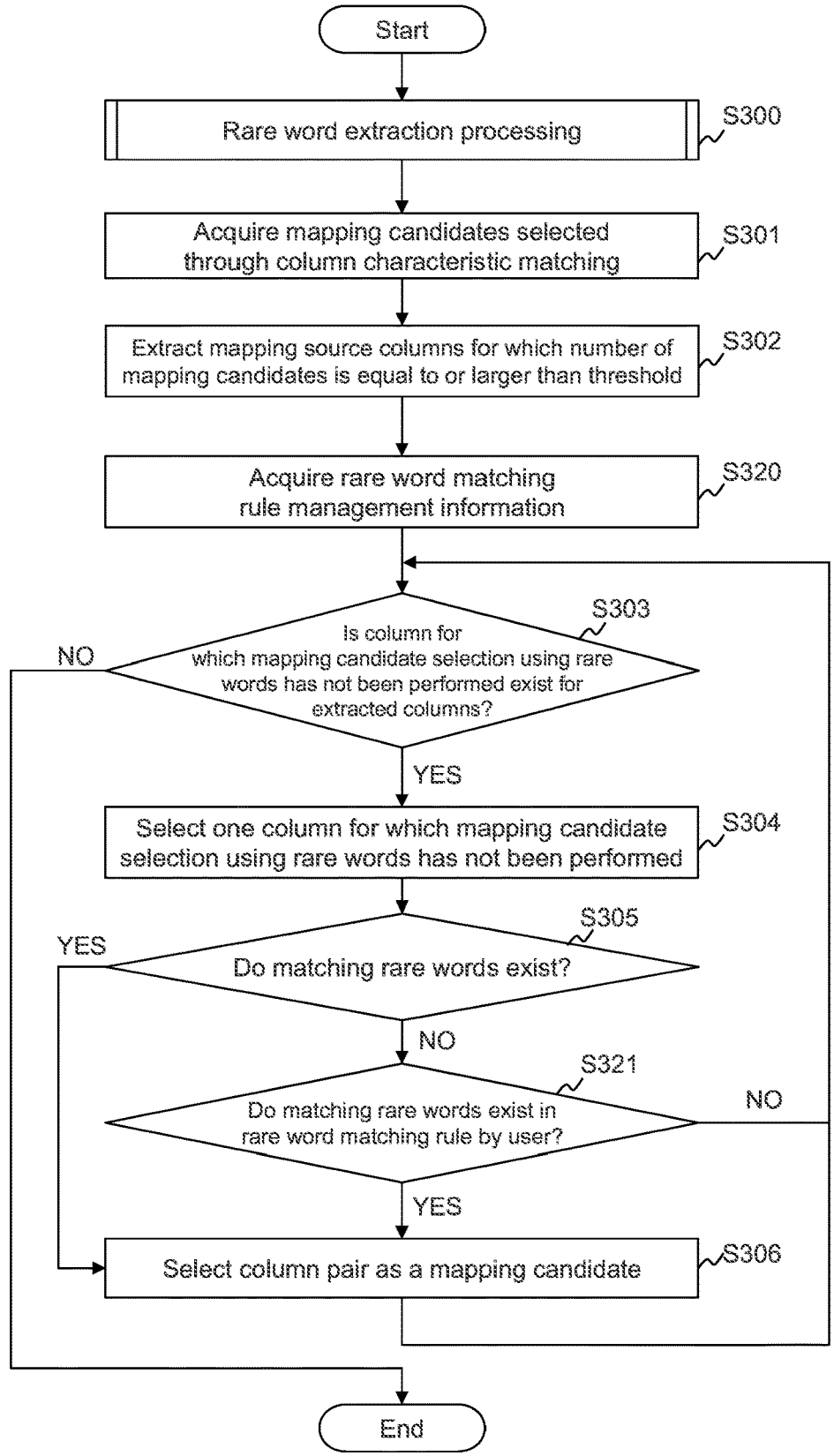
FIG. 23 is a flowchart of mapping candidate selection processing through rare word matching according to Embodiment 3.

FIG. 23 is a flowchart of the mapping candidate selection processing through rare word matching according to Embodiment 3. Note that the same reference symbols will be assigned to steps which are similar to those in the mapping candidate selection processing through rare word matching according to Embodiment 1 illustrated in FIG. 11, and overlapping description will be omitted.

The mapping candidate selection processing through rare word matching according to Embodiment 3 further includes acquisition processing (step S320) of acquiring the rare word matching rule management information 124 and determination processing (step S321) of determining whether or not there exists a matching rare word in a rare ward matching rule created by an instruction from the user.

In step S320, the rare word match determining unit 122 receives the rare word matching rule management information 124 (step S320).

In step S305, in the case where a column pair for which rare words around the columns match does not exist (step S305: NO), the rare word match determining unit 122 determines whether or not a pair of rare words relating to the column pair selected in step S304 matches a pair of rare words included in the rare word matching rule management information 124 (step S321).

As a result, in the case where the pair of rare words relating to the selected column pair matches the pair of rare words included in the rare word matching rule management information 124 (step S321: YES), the mapping candidate selecting unit 123 selects the column pair selected in step S304 as a mapping candidate (step S306). On the other hand, in the case where the pair of rare words relating to the selected column pair does not match the pair of rare words included in the rare word matching rule management information 124 (step S321: NO), the rare word match determining unit 122 makes the processing proceed to step S303.

Here, an example will be described where, in the case where a pair of "Prod" and "Production" is registered as a pair of rare words in the rare word matching rule management information 124, in step S304 of the mapping candidate selection processing through rare word matching, a ProdID column of the MstProd table illustrated in FIG. 3 and an ID column of the Part table are acquired as a column pair.

In step S305, the rare word match determining unit 122 determines whether there exists matching rare words. While a rare word of the ProdID column in the Prod table is "Prod", and rare words of the ID column in the Part table are three, that is, "Part", "Production" and "BillOfMaterials", because the rare word of the ProdID column in the Prod table does not match any rare words of the ID column in the Part table, it is determined that matching rare words do not exist, and the processing shifts to step S321.

In step S231, it is determined by the rare word match determining unit 122 that a pair of rare words of "Prod" and "Production" included in the rare word matching rule management information 124 matches a pair of the rare word "Prod" of the ProdID column in the Prod table and a rare word "Production" of the ID column in the Part table, and the ProdID column in the Prod table and the ID column in the Part table are selected as mapping candidates in step S306.

As described above, in the data integration server 10 according to Embodiment 3, because a pair of rare words stored in the rare word matching rule management information 124 as a pair of rare words by an instruction of the user is judged as identical rare words, it is possible to appropriately select mapping candidates according to an intention from the user.

Note that the present invention is not limited to the above-described embodiments, and can be modified as appropriate and implemented without departing from the spirit of the present invention.

For example, while, in the above-described embodiments, whether or not columns in a column pair, selected as mapping candidates on the basis of the column characteristics are mapping candidates is judged through rare word matching, the present invention is not limited to this, and whether or not an arbitrary column pair of a column of the mapping source data model and a column of the mapping destination data model is mapping candidates may be judged by performing matching through rare word matching. That is, the column pair may be selected as mapping candidates in the case where only determination conditions through rare word matching are satisfied.

Further, part of or all of the above-described functional units may be implemented with hardware by, for example, being designed with integrated circuits. Further, a program constituting the functional units may be provided by a recording medium in which a program code is recorded. In this case, it is possible to implement the functional units by a processor of a computer reading and executing the program in the recording medium. As a storage medium for supplying the program code, for example, a flexible disk, a CD-ROM, a DVD-ROM, a hard disk, an SSD (Solid State Drive), an optical disc, a magnetooptical disk, a CD-R, a magnetic tape, a nonvolatile memory card, a ROM, or the like, may be used. Further, the program code which realizes functions described in the present embodiments may be implemented with a wide range of programs or a script language such as assembler, C/C++, perl, Shell, PHP and Java (registered trademark).

Further, by the program code for realizing the functional units of the embodiments being delivered via a network, the program code is stored in a storage unit such as a hard disk and a memory of a computer or a storage medium such as a CD-RW and CD-R, and a processor provided in the computer may read and execute the program code stored in the storage unit or the storage medium.

What is claimed is:

1. A synonymous column candidate selecting apparatus for detecting from a second data model a synonymous column candidate which is a candidate for a column synonymous with a column of a first data model,
   a processor of the synonymous column candidate selecting apparatus is configured to:
   perform rare word detection processing of detecting one or more first rare words which are words used in tables in the first data model and which are not used in other tables in the first data model more than a predetermined number of times, and detecting one or more second rare words which are used in the second data model and which are not used in other tables in the second data model more than a predetermined number of times,
   identify a first column in a first table in the first data model based on a detected first rare word in the first column and identify a second column in a second table of the second data model based on a detected second rare word in the second column,
   determine whether or not the second column of the second data model is a synonymous column candidate of the first column of the first data model,
   upon determining that the second column is a synonymous column candidate of the first column, selecting the second column as the synonymous column candidate of the first column,
   wherein the processor is configured to specify a column characteristic similarity degree which is a degree of similarity of column characteristics between the first column and the second column,
   wherein the determination conditions include a condition that the column characteristic similarity degree is equal to or larger than a predetermined threshold,
   wherein the processor is configured to execute the determination processing on the first column and the second column when the column characteristic similarity degree between the first column and the second column is equal to or larger than the predetermined threshold, and
   wherein the processor is configured to execute the determination processing on a plurality of second columns for which the column characteristic similarity degrees with the same first column is equal to or larger than the predetermined threshold, and the first column.

2. The synonymous column candidate selecting apparatus according to claim 1,
   wherein the processor is configured to display and output the first column and the second column which is selected as the synonymous column candidate of the first column.

3. The synonymous column candidate selecting apparatus according to claim 1,
   wherein, in determining whether or not the second column of the second data model is a synonymous column candidate of the first column of the first data model, performing matching between the detected first rare word in the first column and a detected second rare word in the second column so as to include a partial match between the detected first rare word and the detected second rare word.

4. The synonymous column selecting apparatus according to claim 1,
   wherein the predetermined number is 0.

5. The synonymous column selecting apparatus according to claim 1,
   wherein, in identifying the first column in the first table in the first data model based on a detected first rare word in the first column, searching is performed for the detected first rare word in at least one of the first table and an upper table or a lower table of the first table, and, in identifying the second column in the second table of the second data model based on the detected second rare word in the second column, searching is performed for the detected second rare word in at least one of the second table and an upper table or a lower table of the second table.

6. The synonymous column candidate selecting apparatus according to claim 1,
   wherein the processor is configured to:
   accept a designation from a user as to whether or not to perform the rare word detection processing.

7. The synonymous column candidate selecting apparatus according to claim 1,
   wherein the processor is configured to:
   accept a designation of a pair of words regarded as identical rare words from a user,
   store the accepted pair of words in a storage apparatus, and
   in determining whether or not the second column of the second data model is a synonymous column candidate of the first column of the first data model, performing a matching comparison between the determined first rare word and the second rare word so as to include performing a matching comparison between a pair of the determined first rare word and the determined second rare word, and the accepted pair of words.

8. The synonymous column candidate selecting apparatus according to claim 1,
wherein the processor is configured to:
obtain synonymous column settlement information which designates the first column and the second column from a user,
set a table similarity degree which indicates a possibility that the second column which becomes a synonymous column candidate of the first column in the first table exists in the second table on the basis of the synonymous column settlement information, and
select the second column, if it is not designated as a synonymous column, as a synonymous column candidate for the first column if a synonymous column has not been settled upon for the first table and the second table and for which the table similarity degree is equal to or larger than a predetermined value.

9. The synonymous column candidate selecting apparatus according to claim 1,
wherein the processor is configured to:
translate a word used in one of the first data model and the second data model into a language of a word used in the other data model of the first data model and the second data model, and
execute the rare word detection processing and the step of determining by utilizing the translated word.

10. The synonymous column candidate selecting apparatus according to claim 1,
wherein the processor is configured to:
specify a column characteristic similarity degree between the first column and the second column on the basis of a predetermined calculation formula,
obtain synonymous column settlement information which designates the first column and the second column from a user, and
adjust a calculation formula so that a higher column characteristic similarity degree between the first column and the second column included in the synonymous column settlement information is specified.

11. A synonymous column candidate selecting method by a synonymous column candidate selecting apparatus for detecting from a second data model a synonymous column candidate which is a candidate of a column synonymous with a column of a first data model,
the synonymous column candidate selecting apparatus:
executes rare word detection processing of detecting one or more first rare words which are words used in tables in the first data model and which are not used in other tables in the first data model more than a predetermined number of times, and detecting one or more second rare words which are words used in the second data model and which are not used in the second data model more than a predetermined number of times,
identifies a first column in a first table in the first data model based on a detected first rare word in the first column and identifies a second column in a second table of the second data model based on a detected second rare word in the second column,
determines whether or not the second column of the second data model is a synonymous column candidate of the first column of the first data model, and
upon determining that the second column is a synonymous column candidate of the first column, select the second column as the synonymous column candidate of the first column,
specifies a column characteristic similarity degree which is a degree of similarity of column characteristics between the first column and the second column, wherein the determination conditions include a condition that the column characteristic similarity degree is equal to or larger than a predetermined threshold,
executes the determination processing on the first column and the second column when the column characteristic similarity degree between the first column and the second column is equal to or larger than the predetermined threshold, and
executes the determination processing on a plurality of second columns for which the column characteristic similarity degrees with the same first column is equal to or larger than the predetermined threshold, and the first column.

12. A non-transitory computer readable medium storing a synonymous candidate selecting program for causing a computer constituting a synonymous column candidate selecting apparatus configured to detect from a second data model a synonymous column candidate which is a candidate of a column synonymous with a column of a first data model,
the synonymous candidate selecting program causing the computer to execute:
rare word detection processing of detecting one or more first rare words which are words used in the first data model and which are not used in other tables in the first data model more than a predetermined number of times, and detecting one or more second rare words which are words used in the second data model and which are not used in other tables in the second data model more than a predetermined number of times,
identification processing of identifying a first column in a first table in the first data model based on a detected first rare word in the first column and identifying a second column in a second table of the second data model based on a detected second rare word in the second column;
determination processing of determining whether or not the second column of the second data model is a synonymous column candidate of the first column of the first data model, and
upon determining that the second column is a synonymous column candidate of the first column, performing selection processing of selecting the second column as the synonymous column candidate of the first column,
specifying processing of specifying a column characteristic similarity degree which is a degree of similarity of column characteristics between the first column and the second column, wherein the determination conditions include a condition that the column characteristic similarity degree is equal to or larger than a predetermined threshold,
wherein the processor is configured to execute the determination processing on the first column and the second column when the column characteristic similarity degree between the first column and the second column is equal to or larger than the predetermined threshold, and
wherein the processor is configured to execute the determination processing on a plurality of second columns for which the column characteristic similarity degrees with the same first column is equal to or larger than the predetermined threshold, and the first column.

* * * * *